(12) United States Patent
Ihara

(10) Patent No.: US 8,265,368 B2
(45) Date of Patent: Sep. 11, 2012

(54) IMAGE ANALYSIS APPARATUS, IMAGE PROCESSING APPARATUS, IMAGE ANALYSIS PROGRAM STORAGE MEDIUM, IMAGE PROCESSING PROGRAM STORAGE MEDIUM, IMAGE ANALYSIS METHOD AND IMAGE PROCESSING METHOD

(75) Inventor: Satoshi Ihara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 1031 days.

(21) Appl. No.: 12/209,332

(22) Filed: Sep. 12, 2008

(65) Prior Publication Data
US 2009/0087058 A1    Apr. 2, 2009

(30) Foreign Application Priority Data
Sep. 28, 2007   (JP) .................. 2007-256290

(51) Int. Cl.
*G06K 9/34*       (2006.01)
*G06K 9/36*       (2006.01)

(52) U.S. Cl. ....................................... 382/131; 382/132
(58) Field of Classification Search .................. 382/131, 382/132; 378/57
See application file for complete search history.

(56) References Cited

U.S. PATENT DOCUMENTS

| | | | | |
|---|---|---|---|---|
| 5,056,146 | A * | 10/1991 | Nishide | 382/131 |
| 5,712,926 | A * | 1/1998 | Eberhard et al. | 382/205 |
| 6,026,143 | A * | 2/2000 | Simanovsky et al. | 378/57 |
| 6,026,171 | A * | 2/2000 | Hiraoglu et al. | 382/100 |
| 6,035,014 | A * | 3/2000 | Hiraoglu et al. | 378/57 |
| 6,195,444 | B1 * | 2/2001 | Simanovsky et al. | 382/100 |
| 6,721,387 | B1 * | 4/2004 | Naidu et al. | 378/8 |
| 7,251,355 | B2 * | 7/2007 | Nishide | 382/154 |
| 7,689,038 | B2 * | 3/2010 | Zahniser | 382/180 |
| 7,974,471 | B2 * | 7/2011 | Matsuno | 382/180 |

FOREIGN PATENT DOCUMENTS
JP    9-187444 A    7/1997
* cited by examiner

*Primary Examiner* — Allen C. Ho
(74) *Attorney, Agent, or Firm* — Birch, Stewart, Kolasch & Birch, LLP

(57) ABSTRACT

Plural sectional images are acquired at a plurality of slice positions arranged in a predetermined direction in a subject. Each of the plural sectional images acquired by the image acquisition section is binarized based on a predetermined reference image density. Each image included in the sectional images binarized by the binarizing section is classified into a first image group having the images inside the subject and a second image group having the images outside the subject, based on the relative position of the each image from the other images in the same sectional image and also the relative position of the each image from other images contained in another sectional images.

7 Claims, 37 Drawing Sheets

(A)

(B)

(A)

(B)

(A)

(B)

IMAGE ANALYSIS APPARATUS, IMAGE PROCESSING APPARATUS, IMAGE ANALYSIS PROGRAM STORAGE MEDIUM, IMAGE PROCESSING PROGRAM STORAGE MEDIUM, IMAGE ANALYSIS METHOD AND IMAGE PROCESSING METHOD

BACKGROUND OF THE INVENTION

1. Field of the Invention

The present invention relates to an image analysis apparatus, an image analysis program storage medium and an image analysis method for classifying an image included in a medical image on display, and an image processing apparatus, an image processing program storage medium and an image processing method for extracting the image of a subject included in the medical image on display.

2. Description of the Related Art

In the conventional medical field, a medical image photographed inside a subject using the X-ray photographic apparatus, the ultrasonic apparatus and the endoscopic apparatus are widely utilized for diagnosing the conditions of the subject, etc. By utilizing the medical image for diagnosis, the progress of the disease of the subject can be grasped without any external damage to the subject, and therefore, the information required for determining the treatment method can be easily obtained.

In addition to the X-ray photographic apparatus and the endoscopic apparatus, more and more hospitals have come to introduce the CT (Computerized Tomography) apparatus and the MRI (Magnetic Resonance Imaging) apparatus for photographing plural sectional images at each of the plural slice positions of the subject. The CT apparatus and the MRI apparatus, as compared with the endoscopic apparatus with an optical probe inserted in the body of the subject, can reduce the pain of the subject during the inspection, while at the same time three-dimensionally confirming the accurate position and size of the seat of a disease or the affected part using plural sectional images. In recent years, therefore, the CT and MRI apparatuses have come to be employed also for the purpose of the thorough physical examination.

In the CT and MRI apparatuses, the photographing operation is performed while the subject is laid on the diagnostic table, and therefore, the medical image photographed generally include also the diagnostic table, the cloth worn by the subject and the medical equipment located near the subject. Presently, the anomalous part considered the seat of a disease is automatically extracted by analyzing each pixel of the medical image or the degree of obesity is confirmed from the sectional area of the sectional image. In order to realize these processes, only the subject area associated with the subject in the medical image is required to be extracted with high accuracy.

In a widely-known method of extracting the subject area in the medical image, a high-density area having an image density not lower than a reference density is extracted as a subject area from the medical image taking advantage of the fact that the subject area associated with the subject has a higher image density than the remaining areas. According to this method, however, the area of the diagnostic table, etc. having an image density as high as the subject area is also extracted, and therefore, the user is required to take the trouble of manually removing the unrequited areas other than the subject area, thereby posing the problem a considerable time is required.

With regard to this problem, Japanese Patent Application Laid-Open (JP-A) No. 9-187444 discloses a method in which high-density areas having an image density not lower than a reference density are extracted and after executing the smoothing process using a median filter, the subject area is extracted based on the size of each high-density area. In the medical image after the smoothing process, however, the subject area undergoes only a small change while the contour line of the unrequited area such as the diagnostic table is discontinued, resulting in a reduced size of the unrequited area. In the method described in JP-A No. 9-187444, the unrequited area in the medical image is accurately removed by taking advantage of this feature, and therefore, the user is not required to take the trouble of manually removing the unrequited area, thereby facilitating the extraction of the subject area in the medical image.

While the unrequired area in the medical image is extracted with high accuracy, the use of the method described in JP-A No. 9-187444, however, leads to an erroneous recognition that the image area including the parts such as the throat, the ears and the nose connected to the body surface is erroneously extruded from the subject area. Also, the lung contains the air and therefore the image density of the lung area in the medical image is reduced, with the result that the lung area cannot be extracted as the subject area by the method described in JP-A No. 9-187444. After all, therefore, the technique described in JP-A No. 9-187444 poses the problem that the user is required to manually extract again the lung field, etc.

Another problem of the method described in JP-A No. 9-187444 is that one of the two legs of the subject is lost in the medical image, i.e. a small part imaged at a distance from the body fails to be included.

SUMMARY OF THE INVENTION

The present invention has been made in view of the above circumstances and provides an image analysis apparatus, an image processing apparatus, an image analysis program storage medium, an image processing program storage medium, an image analysis method and an image processing method capable of accurately extracting the subject area in a medical image.

According to the present invention, there is provided an image analysis apparatus including: an image acquisition section that acquires a plurality of sectional images at each of a plurality of slice positions arranged in a predetermined direction in a subject; a binarizing section that binarizes each of the plurality of sectional images acquired by the image acquisition section, based on a predetermined reference image density; and a classification section that classifies each image contained in the sectional image binarized by the binarizing section into a first image group having the images inside the subject and a second image group having the images outside the subject, based on the relative position of the each image from the other images in the same sectional image and also the relative position of the each image from other images contained in another sectional images.

With the image analysis apparatus according to the present invention, plural sectional images are each binarized based on a predetermined reference image density, and the specific images included in binarized sectional image are classified into a first image group having images inside the subject and a second image group having images outside the subject based on the positional relation between the specific images in the particular sectional image and the specific images in the other sectional images. In this way, each specific image in the sectional images is classified taking a cubic as well as a planar aspect into consideration, and therefore, even an image of the lung low in image density can be classified accurately as an image inside the subject based on the positional relation with other images.

In the image analysis apparatus according to claim 1, preferably, the classification section classifies a series of images continuous over a plurality of sectional images into the same image group.

An image, if separated in a given cross section, is classified in the same image group as long as it is connected in cubic fashion, thereby eliminating the inconvenience of erasing a part of the subject covered by a given sectional image.

In the image analysis apparatus according to claim 1, it is preferable that in the case where an image in one sectional image surrounds another image, the classification section classifies these images into the same image group.

With this preferred image analysis apparatus, even a lung area, for example, which belongs to the subject but has a low image density can be classified accurately as an internal image of the subject.

In the image analysis apparatus according to claim 1, preferably, the classification section reclassifies, among the images having been classified into the second image group, an image that is inserted between the images classified into the first image group in a sectional image containing the image and that is sandwiched as well in the predetermined direction by the images classified into the first image group, as the first image group.

With this preferred image analysis apparatus, the hole portions such as the nose, the depth of the throat and the ears connected to the body exterior can be accurately classified as an internal image of the subject.

According to the present invention, there is provided an image processing apparatus including: an image acquisition section that acquires a plurality of sectional images at each of a plurality of slice positions arranged in a predetermined direction in a subject; a binarizing section that binarizes each of the plurality of the sectional images acquired by the image acquisition section, based on a predetermined reference image density; a classification section that classifies each image contained in the sectional image binarized by the binarizing section into a first image group having the images inside the subject and a second image group having the images outside the subject, based on the relative position of the each image from the other images in the same sectional image and also the relative position of the each image from other images contained in another sectional images; and an image processing section that removes the second image group included in each of the plurality of the sectional images.

The image processing apparatus according to the present invention can easily generate a medical image useful for diagnosis by extracting only the image inside the subject included in the sectional image.

Although only the basic forms of the image processing apparatus are described herein simply to avoid the duplication, the image processing apparatus according to the present invention includes various forms corresponding to each type of the image analysis apparatus as well as the basic form thereof.

According to the present invention, there is provided an image analysis program storage medium that stores an image analysis program which is executed in a computer, and which constructs on the computer: an image acquisition section that acquires a plurality of sectional images at each of a plurality of slice positions arranged in a predetermined direction in a subject; a binarizing section that binarizes each of the plurality of the sectional images acquired by the image acquisition section, based on a predetermined reference image density; and a classification section that classifies each image contained in the sectional image binarized by the binarizing section into a first image group having the images inside the subject and a second image group having the images outside the subject, based on the relative position of the each image from the other images in the same sectional image and also the relative position of the each image from other images contained in another sectional images.

With the image analysis program storage medium according to the present invention, an image analysis apparatus can be constructed to accurately classify each image in the sectional image based on the comparison with other images.

Although only the basic form of the image analysis program is described herein simply to avoid the duplication, the image analysis program according to the present invention is not limited to this basic form, and includes various forms corresponding to each type of the image analysis apparatus.

Further, as to the element such as the binarizing section constructed on the computer system by the image analysis program according to the present invention, either each element may be constructed by a single program part or plural elements may be constructed by a single program part. Also, these elements may be constructed for execution of the operation by itself or in response to an instruction issued to another program or program part built in the computer system.

According to the present invention, there is provided an image processing program storage medium that stores an image processing program which is executed in a computer, and which constructs on the computer: an image acquisition section that acquires a plurality of sectional images at each of a plurality of slice positions arranged in a predetermined direction in a subject; a binarizing section that binarizes each of the plurality of the sectional images acquired by the image acquisition section, based on a predetermined reference image density; a classification section that classifies each image contained in the sectional image binarized by the binarizing section into a first image group having the images inside the subject and a second image group having the images outside the subject, based on the relative position of the each image from the other images in the same sectional image and also the relative position of the each image from other images contained in another sectional images; and an image processing section that removes the second image group covered in each of the plurality of the sectional images.

With regard to the image processing program, only the basic form thereof is described herein simply to avoid the duplication. The image processing program according to the present invention, however, is not limited to the basic form but includes various forms corresponding to each type of the image analysis apparatus.

Further, as to the element such as the binarizing section constructed on the computer system by the image processing program according to the present invention, either each element may be constructed by a single program part or plural elements may be constructed by a single program part. Also, these elements may be constructed for execution of the operation by itself or in response to an instruction issued to another program or program part built in the computer system.

According to the present invention, there is provided an image analysis method including the steps of: acquiring a plurality of sectional images at each of a plurality of slice positions arranged in a predetermined direction inside a subject; binarizing each of the plurality of the sectional images acquired by the image acquisition step, based on a predetermined reference image density; and classifying each image contained in the sectional image binarized by the binarizing section into a first image group having the images inside the subject and a second image group having the images outside the subject, based on the relative position of the each image from the other images in the same sectional image and also the relative position of the each image from other images contained in another sectional images.

With regard to the image analysis method, only the basic form thereof is described herein simply to avoid the duplication. The image analysis method according to the present invention, however, is not limited to the basic form but includes various forms corresponding to each type of the image analysis apparatus.

According to the present invention, there is provided an image processing method including the steps of: acquiring a plurality of sectional images at each of a plurality of slice positions arranged in a predetermined direction in a subject; binarizing each of the plurality of sectional images acquired by the image acquisition step, based on a predetermined reference image density; classifying each image contained in the sectional image binarized by the binarizing section into a first image group having the images inside the subject and a second image group having the images outside the subject, based on the relative position of the each image from the other images in the same sectional image and also the relative position of the each image from other images contained in another sectional images; and removing the second image group included in each of the plurality of the sectional images.

Also, with regard to the image processing method, only the basic form thereof is described herein simply to avoid the duplication. The image processing method according to the present invention, however, is not limited to the basic form and includes various forms corresponding to each type of the image analysis apparatus.

According to the present invention, the subject area in a medical image can be accurately extracted.

DETAILED DESCRIPTION OF THE INVENTION

Embodiments of the present invention are described below with reference to the drawings.

Figure 1:
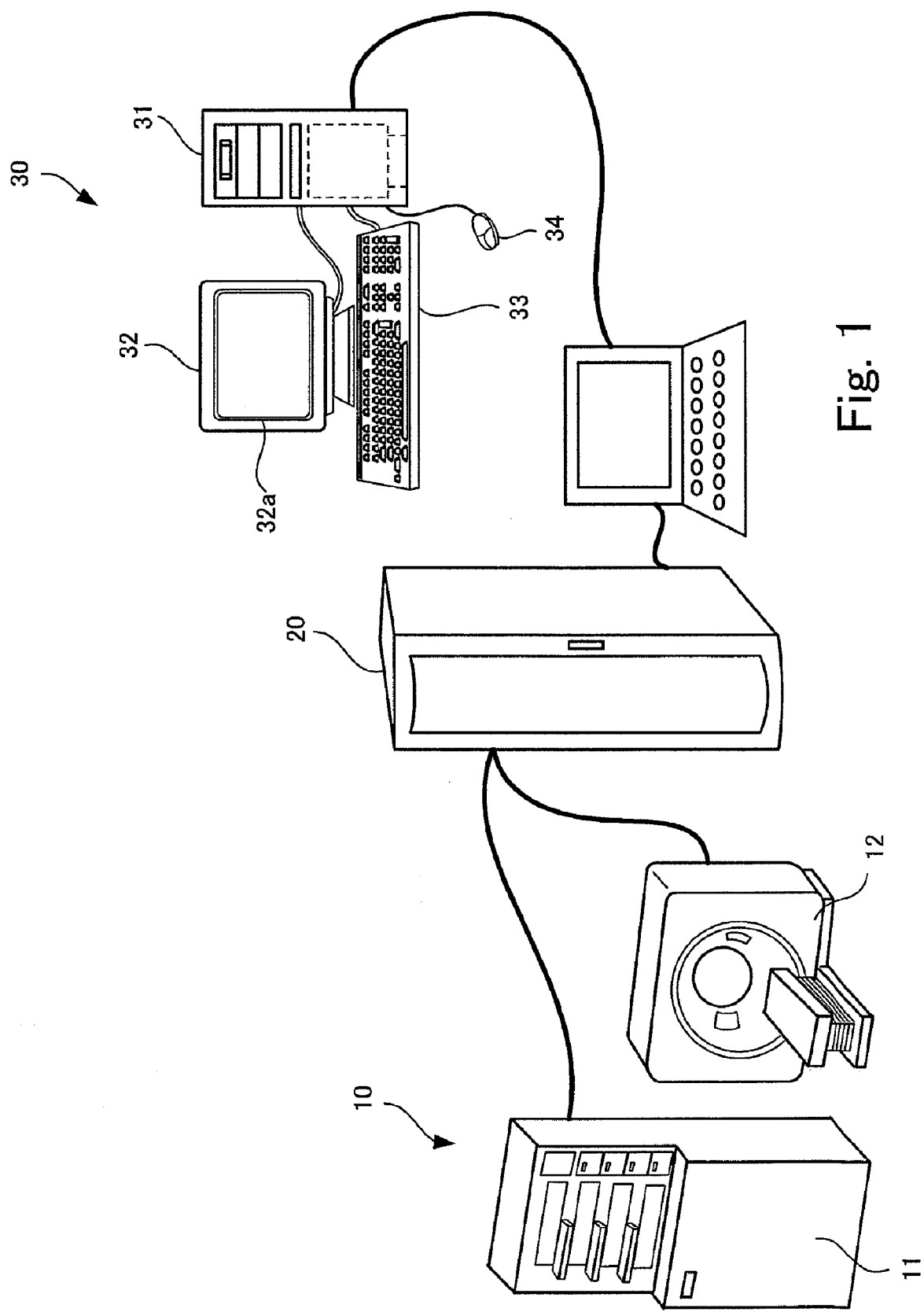
FIG. 1 is a diagram schematically showing the configuration of a medical diagnostic system according to an embodiment of the present invention.

FIG. 1 is a schematic diagram showing the configuration of a medical diagnostic system according to an embodiment of the present invention.

The medical diagnostic system shown in FIG. 1 is configured of an image generating unit 10 for photographing the interior of the body of a subject and forming a medical image, a management server 20 for storing medical images and charts and a diagnostic unit 30 for displaying a medical image. The image generating unit 10, the management server 20 and the diagnostic unit 30 are connected to each other through a network.

In this medical diagnostic system, a new subject is allotted an identification (ID) number for identifying him/her, and the ID number, in correspondence with a chart describing the name, age and the medical history of the subject, is registered in the management server 20.

The image generating unit 10 includes a CR device 11 for generating a digital medical image by reading the radiation transmitted through the subject, a MRI device 12 for generating a sectional image of the subject using the ferromagnetic field and the radio wave, a CT device (not shown) for generating a sectional image of the subject using the radiation or an ultrasonic device (not shown) for generating a medical image by reading the ultrasonic echo. The medical image generated by the image generating unit 10 is sent to the management server 20 together with the ID number for identifying the subject covered by the medical image.

The management server 20, upon receipt of the medical image and the ID number sent from the image generating unit 10, stores the medical image and the ID number in correspondence with each other. Specifically, the management sever 20 has registered therein the ID number, the chart of the subject allotted the ID number and the medical image of the subject in correspondence with each other.

The diagnostic unit 30 includes, on the appearance, a body unit 31, an image display unit 32 for displaying an image on a display screen 32a in response to an instruction from the body unit 31, a keyboard 33 for inputting various information corresponding to the key operation on the body unit 31 and a mouse 34 for inputting an instruction corresponding to an icon, for example, displayed at a position arbitrarily designated on the display screen 32a.

The user inputs the name or the ID number of the subject using the mouse 34, etc. of the diagnostic unit 30. Then, the contents of the input are transmitted to the management server 20. From the management server 20, the medical image and the chart arranged in correspondence with the name or the ID number of the subject transmitted from the diagnostic unit 30 are sent to the diagnostic unit 30. The diagnostic unit 30 removes the areas of the diagnostic table, etc. included in the medical image sent from the management server 20, and generates a medical image in which only the subject area covering the subject is extracted, while at the same time displaying the generated medical image on the display screen 32a. By confirming the size of the medical image and the disease area displayed on the display screen 32a, the user can diagnose the condition of the subject without any external damage to the subject.

The user, watching the medical image displayed on the display screen 32a of the diagnostic unit 30, diagnoses the condition of the subject, and compiles the chart using the mouse 34 and the keyboard 33. The chart thus compiled is sent to the management server 20 so that the chart stored in the management server 20 is updated to the new chart sent from the diagnostic unit 30.

The medical diagnostic system shown in FIG. 1 is basically configured as described above.

The feature of the medical diagnostic system according to an embodiment of the present invention lies in the contents of the process executed by the diagnostic unit 30. The diagnostic unit 30 is described in detail below.

Figure 2:
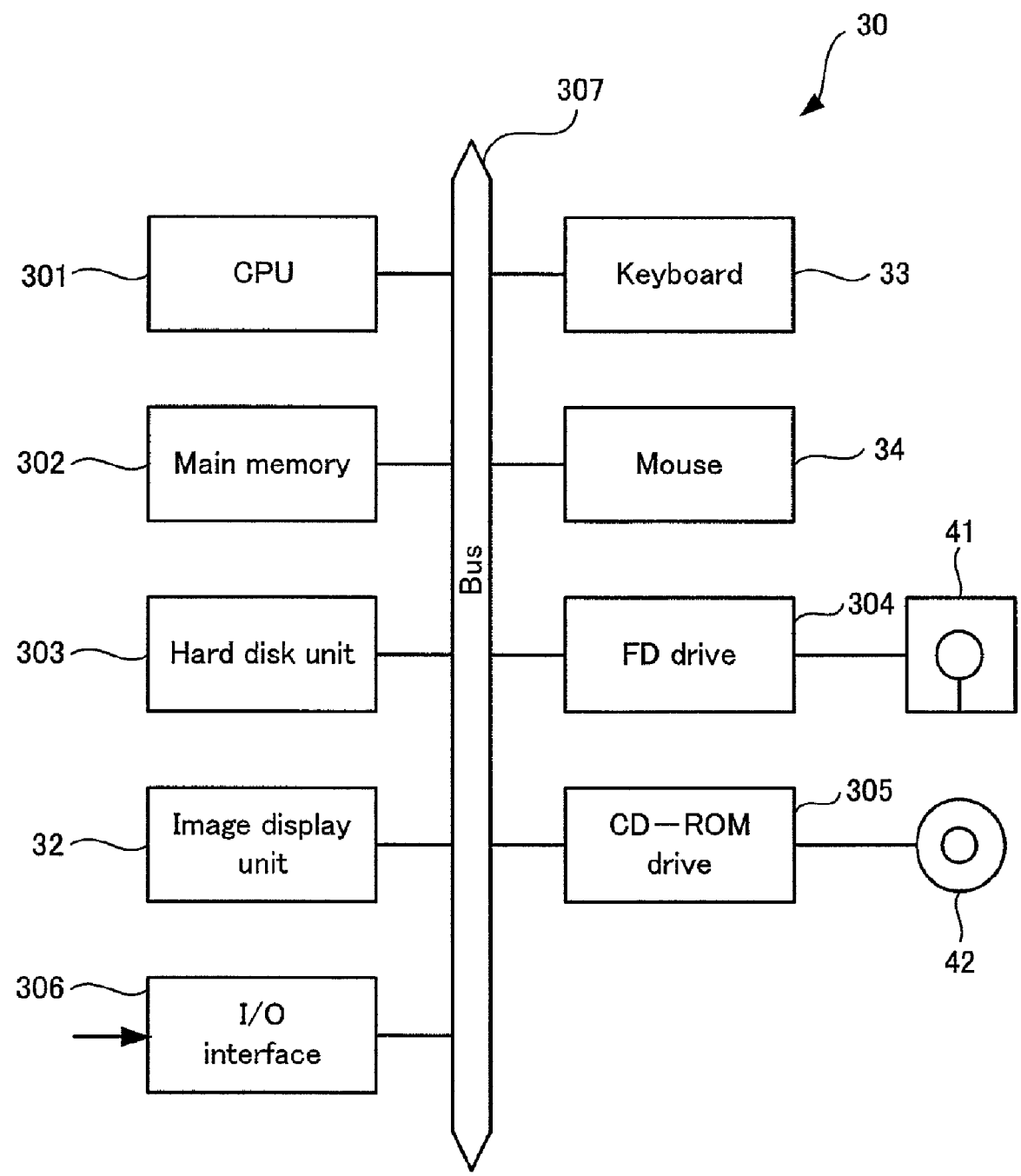
FIG. 2 is a diagram showing the hardware configuration of a diagnostic apparatus.

FIG. 2 is a diagram showing the hardware configuration of the diagnostic unit 30.

The body unit 31 of the diagnostic unit 30, as shown in FIG. 2, has built therein a CPU 301 for executing various programs, a main memory 302 developed so that the program stored in a hard disk unit 303 is read and executed by the CPU 301, the hard disk unit 303 for holding various programs and data, a FD drive 304 for accessing a FD 41 mounted therein, a CD-ROM drive 305 for accessing a CD-ROM 42 and an I/O interface 306 for receiving the image data, etc. from the management server 20 and sending various instruction data to the management server 20. These various elements, the image display unit 32, the keyboard 33 and the mouse 34 shown in FIG. 1 are interconnected through a bus 307 with each other.

The CD-ROM 42 in the diagnostic unit 30 has stored therein a body surface extraction program 100 (see FIG. 3) as the image analysis program and the image processing program according to an embodiment of the present invention.

Figure 3:
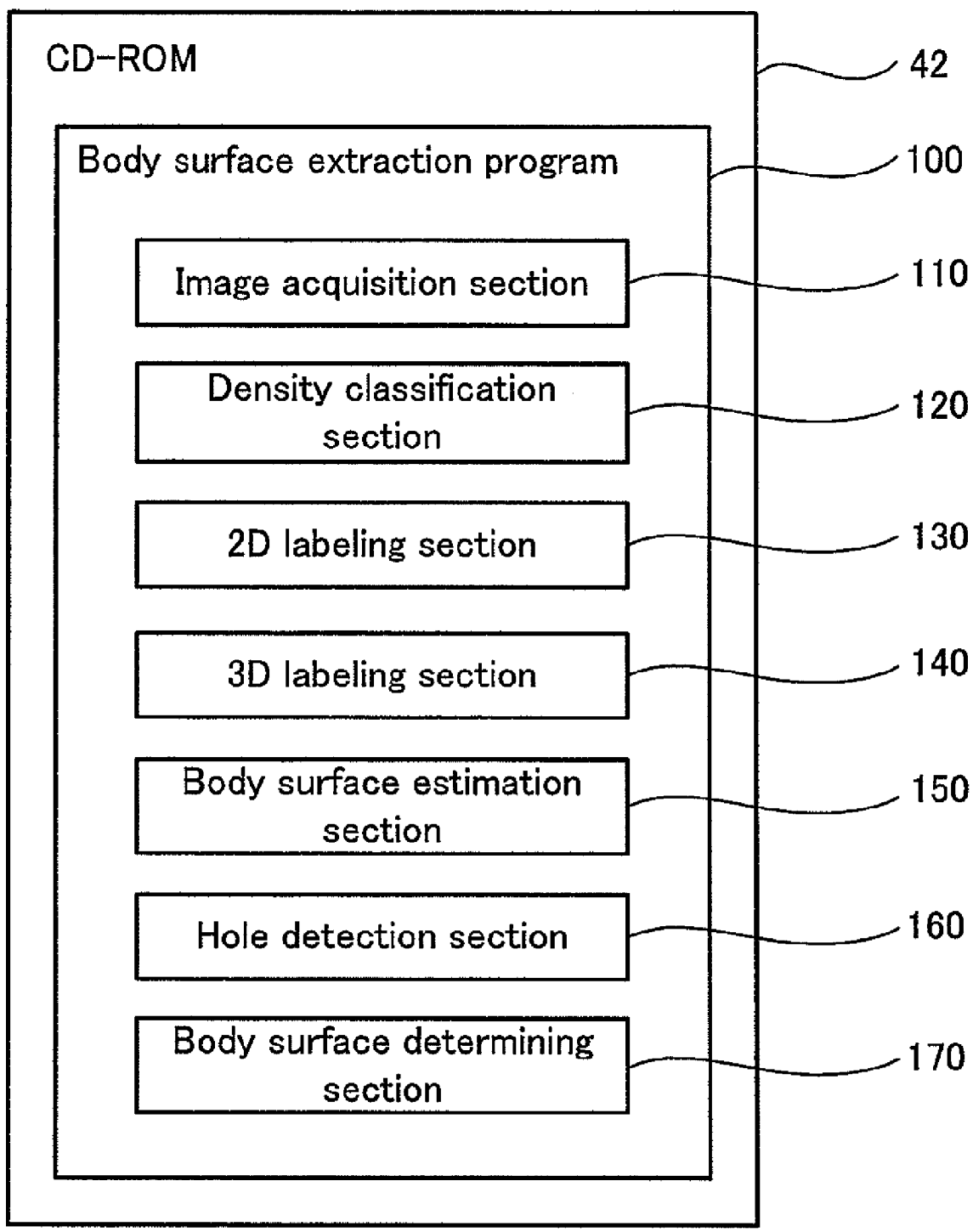
FIG. 3 is a schematic diagram showing a CD-ROM.

FIG. 3 is a schematic diagram showing the CD-ROM 42.

As shown in FIG. 3, the body surface extraction program 100 stored in the CD-ROM 42 is configured of an image acquisition section 110, a density classification section 120, a two-dimensional labeling section 130, a three-dimensional labeling section 140, a body surface estimation section 150, a hole detection section 160 and a body surface determining section 170.

The CD-ROM 42 is mounted on the CD-ROM drive 305 of the diagnostic unit 30, and the body surface extraction program 100 stored in the CD-ROM 42 is uploaded to the diagnostic unit 30 and stored in the hard disk unit 303. By starting and executing the body surface extraction program 100, a body surface extraction unit 200 (see FIG. 4) which is an embodiment of the image analysis apparatus and the image processing apparatus according to the present invention is constructed in the diagnostic unit 30.

Although the CD-ROM 42 is illustrated as a storage medium for storing the body surface extraction program 100 above, the storage medium for storing the body surface extraction program 100 is not limited to the CD-ROM, but may be any of such other storage media as an optical disk, MO, FD and a magnetic tape. Also, the body surface extraction program 100 may be supplied directly to the diagnostic unit 30 through the I/O interface 306 without the intermediary of the storage medium.

Each part of the body surface extraction program 100 is explained in detail later together with the operation of each part of the body surface extraction unit 200.

Figure 4:
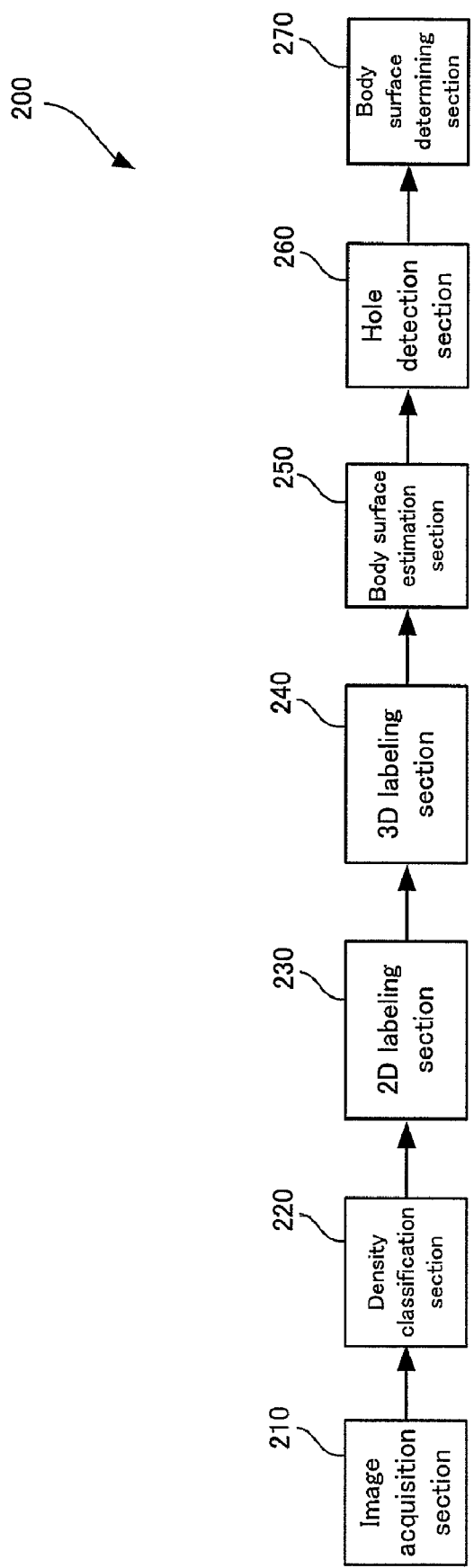
FIG. 4 is a function block diagram of a body surface extraction apparatus.

FIG. 4 is a function block diagram of the body surface extraction unit 200.

The body surface extraction unit 200 includes an image acquisition section 210, a density classification section 220, a two-dimensional labeling section 230, a three-dimensional labeling section 240, a body surface estimation section 250, a hole detection section 260 and a body surface determining section 270.

The image acquisition section 210, the density classification section 220, the two-dimensional labeling section 230, the three-dimensional labeling section 240, the body surface estimation section 250, the hole detection section 260 and the body surface determining section 270 constituting the body surface extraction unit 200 correspond to the image acquisition section 110, the density classification section 120, the two-dimensional labeling section 130, the three-dimensional labeling section 140, the body surface estimation section 150, the hole detection section 160 and the body surface determining section 170, respectively, making up the body surface extraction program 100 shown in FIG. 3.

Each element shown in FIG. 4 is configured of a combination of the computer hardware and the OS or the application program executed by the particular computer, whereas each element of the body surface extraction program 100 shown in FIG. 3 is configured of only the application program among them.

Figure 5:
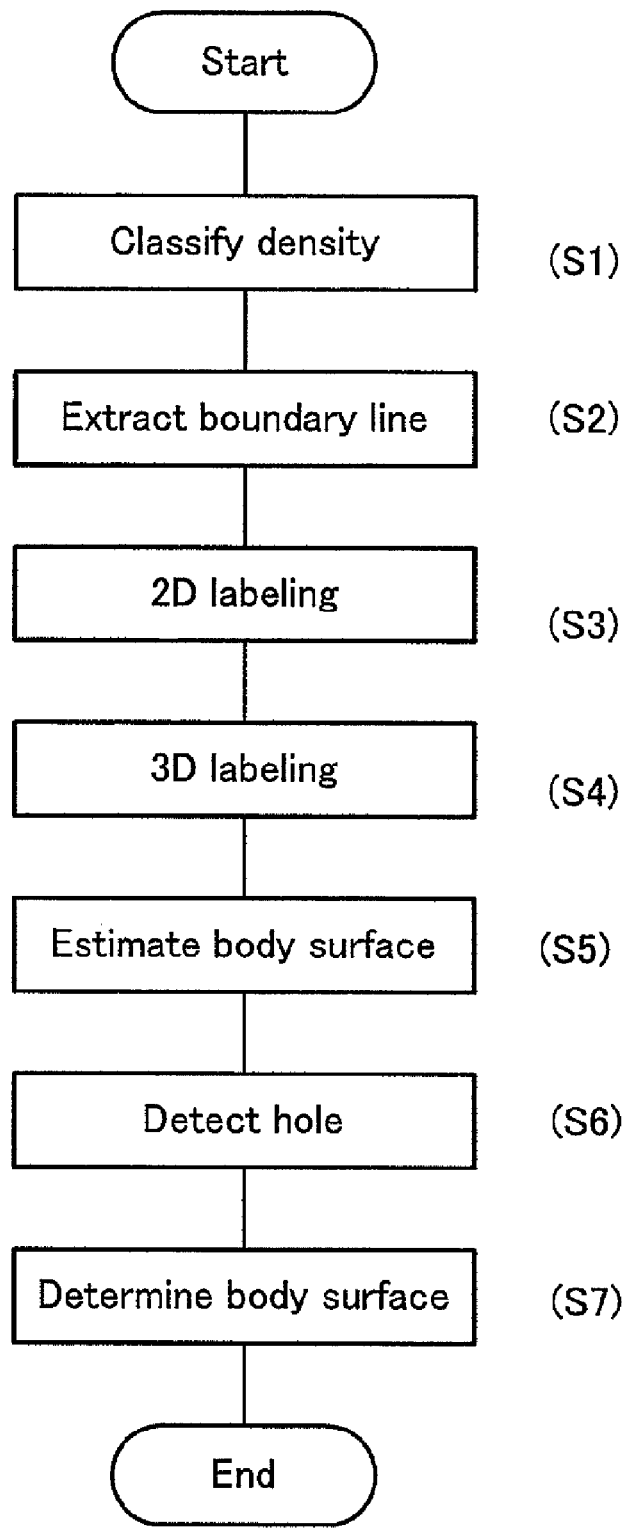
FIG. 5 is a flowchart showing the flow of a series of processes for extracting the body surface of a subject in a medical image acquired from a management server.

FIG. 5 is a flowchart showing the flow of a series of process from the acquisition of the medical image from the management server 20 to the extraction of the body surface of the subject in the medical image by the body surface extraction unit 200 shown in FIG. 4.

Now, an explanation is given, with reference to the flow-chart of FIG. 5, about the operation of each element of the body surface extraction unit 200 shown in FIG. 4 together with each element of the body surface extraction program 100 shown in FIG. 3.

The user inputs the name or the ID number of the subject to be diagnosed, using the mouse 34 and the keyboard 33 shown in FIG. 1. Then, the contents of the input are transmitted to the management server 20 through the I/O interface 306 shown in FIG. 2. From the management server 20, the medical image and the chart corresponding to the name or the ID number transmitted from the diagnostic unit 30 are sent to the diagnostic unit 30.

The medical image sent from the management server 20 is acquired by the image acquisition section 210 shown in FIG. 4.

Figure 6:
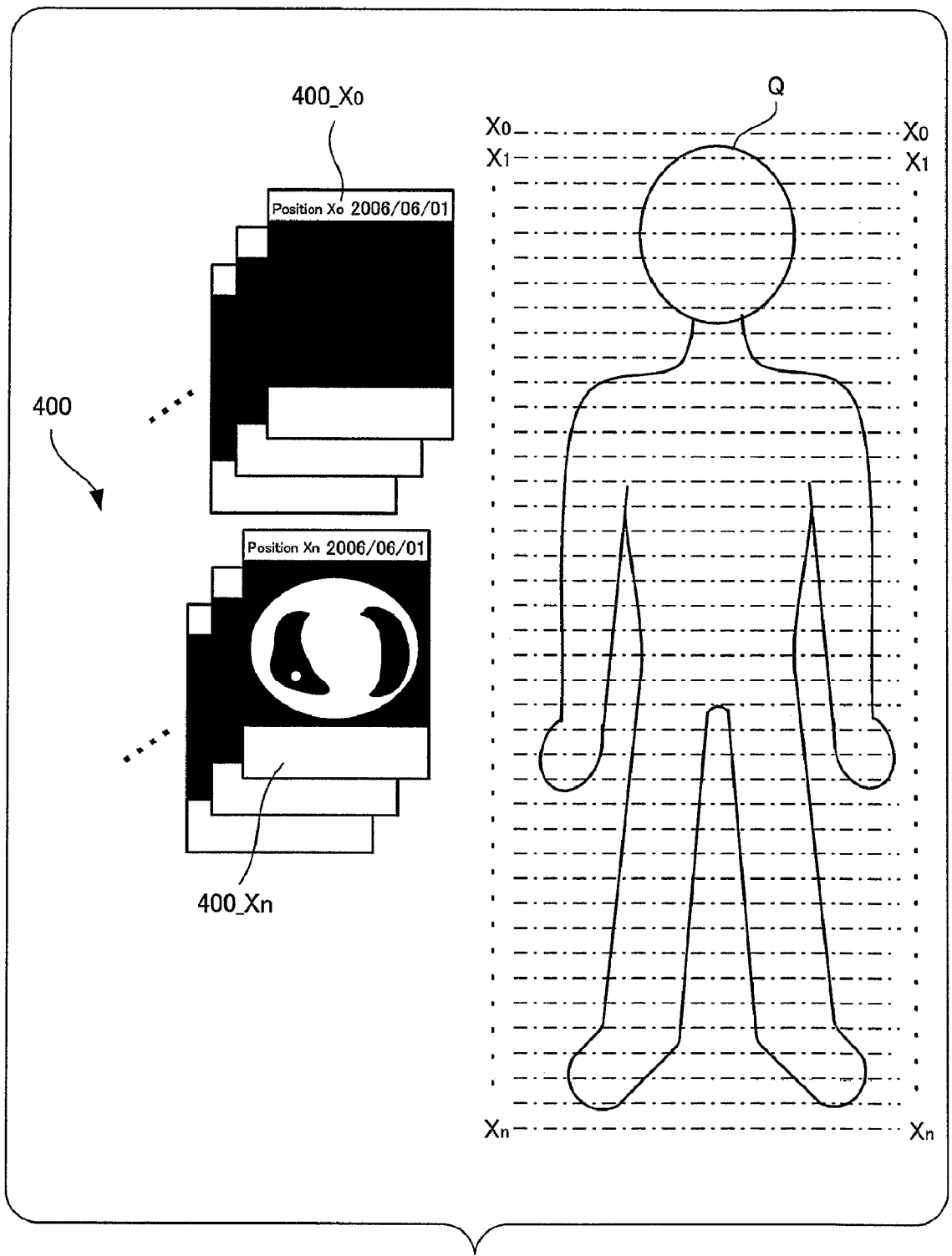
FIG. 6 is a diagram showing a medical image sent from the management server.

FIG. 6 is a diagram showing the medical image sent from the management server 20.

In the MRI device 12 shown in FIG. 1, each section produced by slicing the subject Q at plural slice positions X0 to Xn from the top of the head to the tip of the legs is photographed thereby to produce a group of sectional images 400 configured of plural sectional images 400_X0 to 400_Xn at the plural slice positions X0 to Xn, respectively. In the example shown in FIG. 6, the photographing start position (slice position X0) and the photographing end position (slice position Xn) are displaced from the area in which the subject Q is laid, and the subject Q is not included in the sectional images 400_X0, 400_Xn at the slice positions X0, Xn, respectively. The sectional image group 400 is transmitted to the image acquisition section 210 and further to the density classification section 220.

In the density classification section 220, each pixel in each of the sectional images 400_X0 to 400_Xn making up the sectional image group 400 is classified into a high-density pixel having an image density not lower than a predetermined reference density or a low-density pixel having an image density lower than the reference density (step S1 in FIG. 5). This reference density is an empirically determined value (about 200, for example, in CT value) at which the subject image photographed from the subject in the medical image can be positively extracted.

According to this embodiment, four each of the plural pixels making up each sectional image 400_X0 to 400_Xn are combined and allotted a value indicating one classification result. Thus, reduced label images 400_X0' to 400_Xn' smaller in the number of pixels than the sectional images 400_X0 to 400_Xn, respectively, are generated, and the body surface of the subject is extracted using the label images 400_X0' to 400_Xn'. The description that follows refers to the sectional image 400_Xm and the label image 400_Xm' at the slice position Xm as a representative of the sectional images 400_X0 to 400_Xn and the label images 400_X0' to 400_Xn', respectively.

The body surface extraction unit 200 has prepared therein a label image memory configured of multiple storage areas corresponding to the two-dimensional array of one half of the number of X-direction pixels of the sectional images 400_Xm plus four pixels in X direction on the one hand and one half the number of Y-direction pixels of the sectional image 400_Xm plus four pixels in Y direction on the other hand. Also, in the label image 400_Xm', each of the internal pixels, other than the peripheral ones (two neighboring pixel lines alone the periphery) corresponding to the edge, corresponds to a set of four pixels including two X-direction pixels and two Y-direction pixels coupled with each other in the sectional image 400_Xm.

In the density classification section 220, first, the pixel value of the two neighboring pixel lines along the periphery of the label image 400_Xm' is set to "0". Also, the pixel value of each internal pixel of the label image 400_Xm' is set to the total number (0 to 4) of the high-density pixels, among the four pixels making the corresponding set, having an image density not lower than the reference density.

At this point, the value of each pixel of the label image 400_Xm' corresponding to the pixel set including one or more high-density pixel in the sectional image 400_Xm is "1" or higher, while the value of each pixel of the label image 400_Xm' corresponding to the pixel set configured of only the low-density pixels in the sectional image 400_Xm is "0". As a result, the pixels in the sectional image 400_Xm are classified into high- and low-density pixels. The density classification section 220 corresponds to an example of what is called the binarization section according to the present invention.

Then, each pixel making up the label image 400_Xm' is analyzed, and a pixel "1" to "3" in pixel value surrounded by four upper, lower, left and right adjacent pixels including at least one low density pixel "0" in pixel value is set to "−1".

A conventional method called the morphology for removing the image portion such as the blanket covered on the subject at the time of photographing from the medical image is known in which a predetermined number of pixels (normally, about one pixel) around the high-density image extracted from the medical image is deleted and further a predetermined number of pixels are painted. The process of setting the pixel value to "−1" corresponds to the first half of the morphology.

Once the pixels are classified as described above, the classification result is transmitted to the two-dimensional labeling section 230 shown in FIG. 4. The two-dimensional labeling section 230 extracts the boundary line of each high-density image in the label image 400_Xm' (step S2 in FIG. 5), while at the same time attaching a label number to each high-density image for identifying the particular high-density image (step S3 in FIG. 5).

First, the label number (5 or more, for example) for identifying a high-density label image having the pixel value not lower than "1" of the plural pixels making up the label image 400_Xm' is determined, and the pixel value of the pixels on the immediate outside of the low-density adjacent pixels surrounding the high-density image is set to "the negative version of the label number". In the process, up to a total of two peripheral pixels including one adjacent pixel and one boundary pixel may be referred to for the internal pixels of the label image 400_Xm'. For this reason, a total of four pixels including two pixels "0" in pixel value on the outermost periphery and two boundary pixels are prepared as the peripheral pixel.

Then, the pixel value of each pixel surrounded by the boundary line formed of pixels set to "the negative version of the label number" is set as the label number thereby to paint the pixels. The algorithm generally known as the "seed fill" or the "scan conversion" can be used for painting each pixel in the boundary. The painting algorithm used in this embodiment is explained in detail later. By first extracting the boundary line in this way, the pixels in the low-density image can be painted at the same time even in the case where a low-density image is included in a high-density image such as the lung area. Thus, the pixels in the subject image can be painted quickly and accurately.

Also, in executing the process of step S3, the pixel representing the boundary line surrounding the high-density image is determined as the pixel on the immediate outside of the pixel adjacent to the high-density pixel, so that the adjacent pixel is painted with the high-density pixel together. This process corresponds to the last-half process of the morphology. According to this embodiment, the morphology and the painting process are executed at the same time to achieve a high-speed process.

In parallel to the two-dimensional labeling process, the area and the surrounding length of the painted high-density image are calculated. The area of the high-density image is expressed by the number of pixels painted, and the surrounding length of the high-density image by the total number of pixels in the boundary line with the pixel value set to "−1". Incidentally, in calculating the total number of pixels in the boundary line, the weight of the adjacent pixels in the four direction, i.e. up, down, left and right, are regarded as "1" and that of the diagonally adjacent pixels as "1.5", so that the total number of the adjacent pixels thus weighted is calculated. The maximum and minimum values of the label number, area, surrounding length and the X and Y coordinates of the high-density image and the slice number (Z coordinate) are held in correspondence with the sectional image 400_Xm as label data. In the presence of plural high-density images on the sectional image 400_Xm, one label data is generated for each high-density image, and plural label data are set in correspondence with the sectional image 400_Xm.

The density classification process (step S1), the boundary extraction process (step S2) and the two-dimensional labeling process (step S3) are executed for each sectional image 400_X0 to 400_Xn.

Upon completion of the two-dimensional labeling process, the three-dimensional labeling section 240 shown in FIG. 4 analyzes the interconnection between the two-dimensional high-density images, as viewed along Z direction, extracted for each of the sectional images 400_X0 to 400_Xn, thereby extracting a series of high-density image groups connected in Z direction (step S4 in FIG. 5).

First, based on the maximum and minimum values of the X and Y coordinates included in the label data corresponding to the sectional images 400_X0 to 400_Xn, the minimum rectangle including the high-density image indicated by the particular label data is calculated.

Then, judgment is made as to whether a superposed image portion of the calculated minimum rectangles as viewed along Z axis between the plural sectional images 400_X0 to 400_Xn adjacent to the slice positions X0 to Xn. In the absence of such a superposed portion, the high-density images in the plural sectional images are judged not interconnected. In the case where the minimum rectangles are superposed as viewed along Z axis, on the other hand, analysis is made to determine whether there exist mutually superposed pixels included in the superposed portion of the minimum rectangles. In this case, the analysis is not required for all the pixels included in the superposed portion of the minimum rectangles, but at the time point when at least a predetermined number of pixels are superposed, the high-density images including the superposed pixel portion are judged as interconnected. By analyzing only the pixels in the minimum rectangle in this way, the process can be improved in speed without any waste.

Further, the label data of each of the plural high-density images determined as connected are coupled to each other by a linear list. Upon judgment that plural high-density images exist on one sectional image and are connected with the high-density images on another sectional images, each of the plural label data is coupled with the label data of the mating high-density image superposed.

Figure 7:
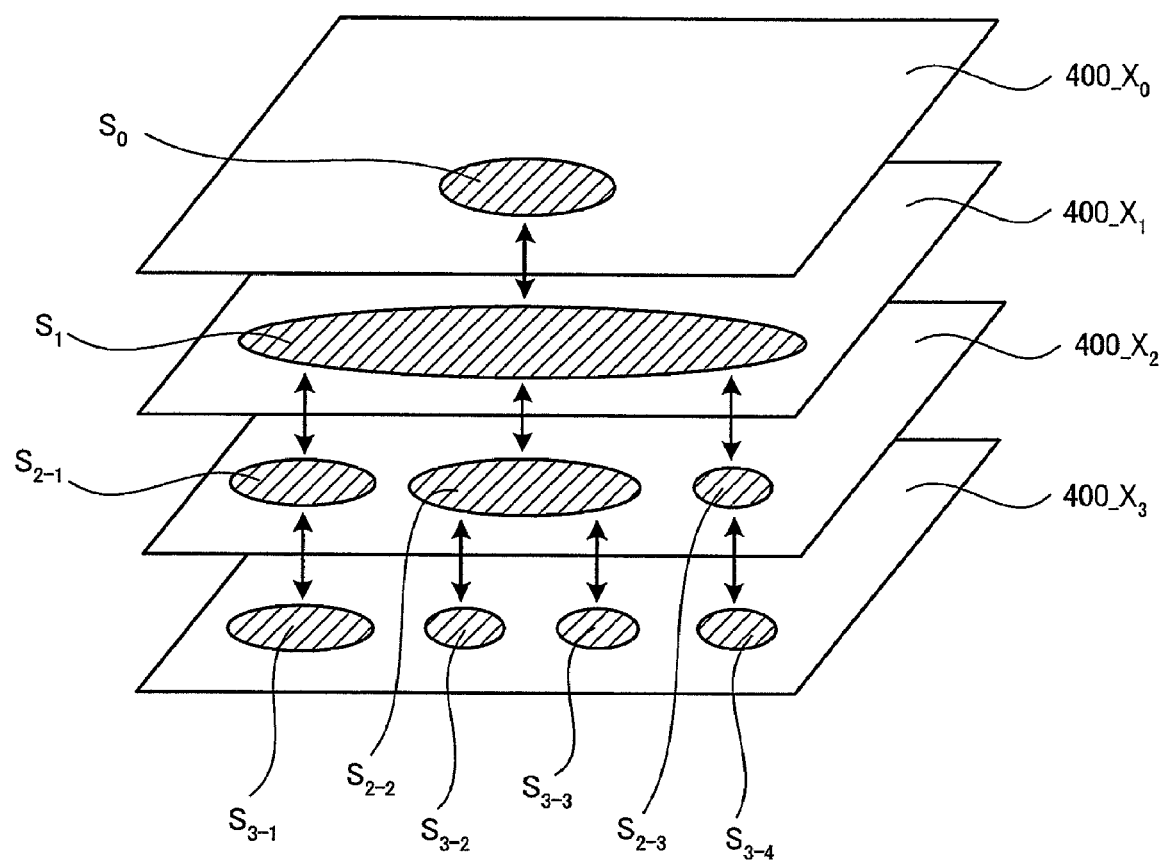
FIG. 7 is a schematic diagram showing the process of coupling high-density images to each other.

FIG. 7 is a schematic diagram showing the process of coupling the high-density images to each other.

The high-density image S0 on the uppermost sectional image 400_X0 is superposed with the second uppermost high-density image S1 as viewed from Z direction, and the label data of these high-density images S0, S1 are coupled to each other.

The second uppermost high-density image S1 having a large area is superposed with the three high-density images S2_1, S2_2, S2_3, respectively, on the third uppermost sectional image 400_X2, and the label data of the high-density image S1 is coupled also with the label data of the three high-density images S2_1, S2_2, S2_3.

The three high-density images S2_1, S2_2, S2_3 on the third uppermost sectional image 400_X2 are superposed also with the three high-density images S3_1, S3_2, S3_3, respectively, on the lowest sectional image 400_X3 and the mutual label data are coupled to each other.

The plural high-density images with the label data thereof coupled to each other form a series of high-density image groups connected in the slice direction, and the process of coupling the plural label data corresponds to the process of extracting the high-density image group. In this way, only the label data in the two-dimensional high-density area are held, while the label data of the three-dimensional high-density image group are not generated. By thus holding only the linear list indicating the connection between the two-dimensional high-density images, the processing time of the three-dimensional labeling can be remarkably reduced.

Upon completion of the three-dimensional labeling process, the body surface estimation section 250 shown in FIG. 4 estimates the body surface on each of the sectional images 400_X0 to 400_Xn (step S5 in FIG. 5).

In the body surface estimation section 250, the linear list is followed thereby to calculate the total area of the high-density images included in each of the plural label data connected and the total surrounding length. Also, based on the total value of the area and the total value of the surrounding length, the volume of the three-dimensional image formed by connecting the contour of a series of the high-density image groups is calculated.

Further, in the case where plural high-density image groups are extracted, the high-density group having the largest volume of the three-dimensional image calculated and the second high-density image group having at least one half of the volume of the three-dimensional image formed by the largest high-density image group among these plural high-density image groups are determined as candidates for the body surface.

Upon determination of the candidates for the body surface, the hole detection section 260 shown in FIG. 4 detects the holes connected from the interior to the exterior of the high-density image groups (step S6 in FIG. 5) thereby to fill the detected holes. The combination of the two-dimensional labeling section 230, the three-dimensional labeling section 240, the body surface estimation section 250 and the hole detection section 260 corresponds to an example of the classification section according to the present invention.

At this time point, the lung area low in image density though inside the subject is extracted as a subject image by painting the pixels in the boundary surrounding the high-density images in step S3 in FIG. 5. The nostril connected from the interior to the exterior of the subject, however, is formed as a hole cut in the subject image. The hole detection section 260 detects the area considered an open hole in the high-density image and executes the process of filling the particular hole.

Figure 8:
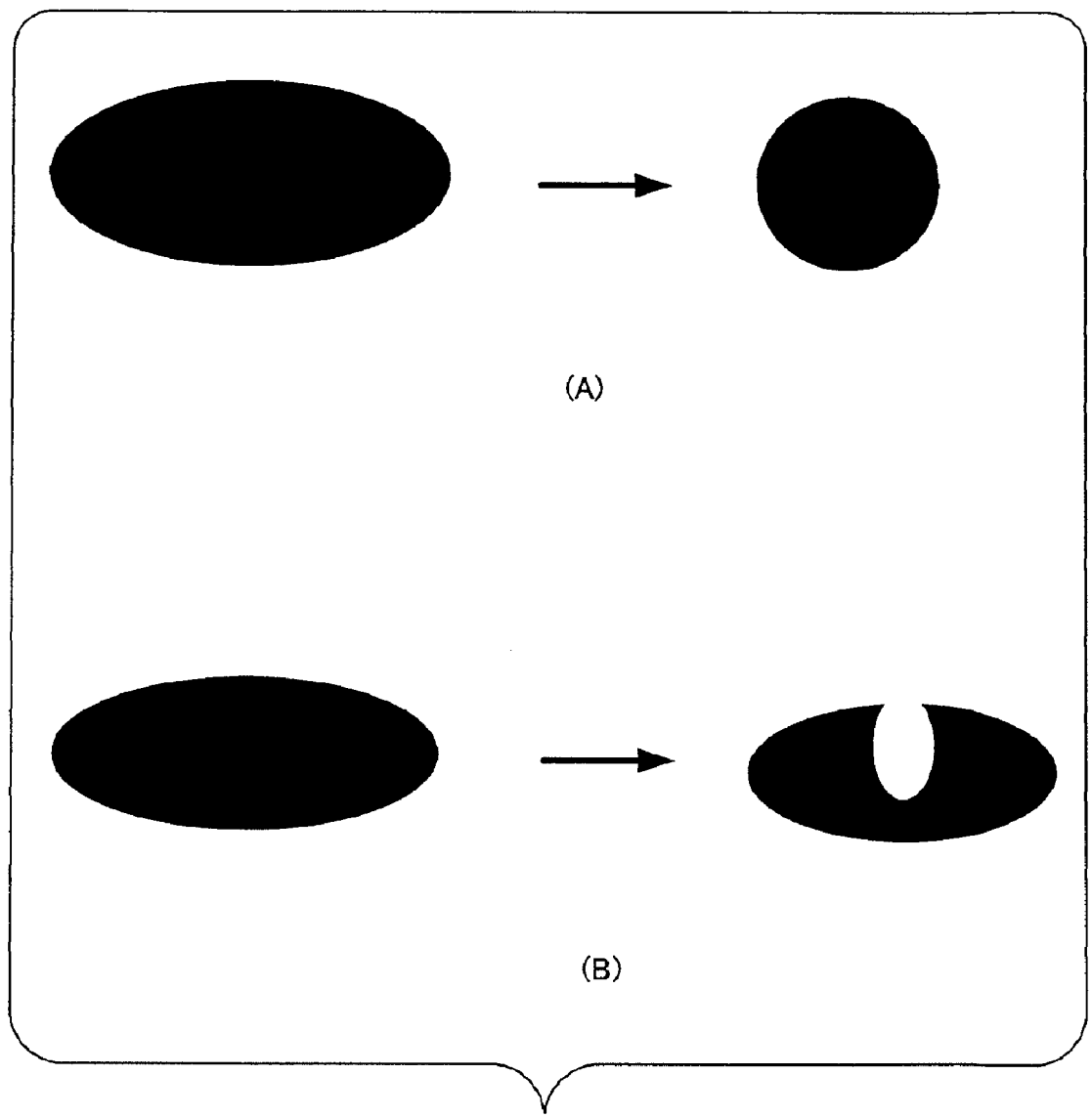
FIG. 8 is a diagram showing an example of the disease area with the contour thereof extracted.

FIG. 8 is a diagram for explaining the method of detecting the hole.

As shown in part (A) of FIG. 8, the reduction in the area size is normally accompanied by the reduction in the surrounding length of the area. In the case where the hole is open at the area as shown in part (B) of FIG. 8, however, the size of the area is reduced by the size of the hole while the surrounding length of the area increases. Using this concept, the sectional image with a hole open in the high-density image is detected according to this embodiment.

In the hole detection section 260, the label data of each of the plural high-density images making up the high-density image groups determined as candidates for the body surface in the body surface estimation section 250 are analyzed in the ascending order of the slice number. First, between the plural label data with the slice numbers adjacent to each other, a first change point is searched for at which the area of the high-density image is sharply reduced (−250 pixels or less), while at the same time sharply increasing the surrounding length of the high-density image (+100 pixels or more).

Then, a second change point is searched for, where contrary to the first change point, the area of the high-density image sharply increases (+250 pixels or more) while the surrounding length of the high-density image sharply decreases (−100 pixels or less).

The high-density image corresponding to the slice number existing between the first and second change points is estimated to be formed with a hole.

Further, the hole estimated to be formed in the high-density image is filled based on the high-density image of each of the two slice numbers on both sides of the slice number of the particular high-density image estimated to be formed with a hole.

Figure 9:
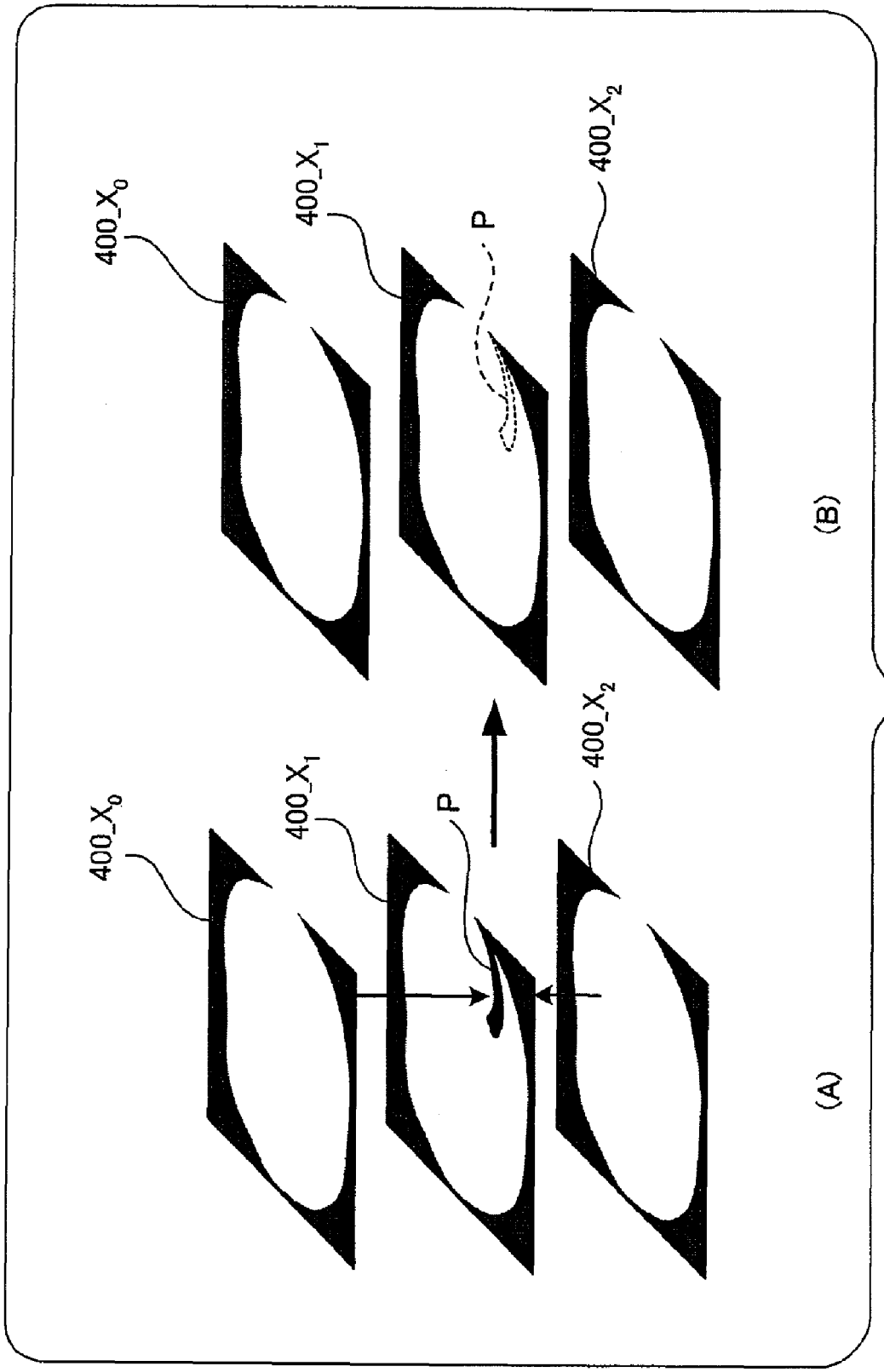
FIG. 9 is a schematic diagram showing the filling process.

FIG. 9 is a schematic diagram showing the hole-filling process.

As shown in part (A) of FIG. 9, assume that a hole P configured of low-density pixels is formed in the high-density image on the sectional image 400_X1 of the slice position X1. Among the low-density pixels forming the hole P, the pixel value of the two corresponding high-density pixels on the sectional images 400_X0, 400_X2 of the two slice positions X0, X2 on both sides of the slice position X1 is set to a high-density value (for example, "1"). As a result, as shown in part (B) of FIG. 9, the hole P thus far open in the high-density image on the sectional image 400_X1 is filled.

Also, assume that a hole is formed on the high-density image over plural sectional images of plural slice numbers. First, the intermediate one of the plural slice numbers is calculated, and the hole-filling process is executed for the sectional image of the intermediate slice number using the upper and lower sectional images not formed with a hole. In similar fashion, the intermediate slice number is calculated and the hole-filling process for the sectional image of the particular slice number is repeated until the hole in the high-density image is filled for all the sectional images.

Upon completion of the hole-filling process, the body surface determining section 270 shown in FIG. 4 determines the final body surface position (step S7 in FIG. 5) and generates new sectional images 400_X0' to 400_Xn' by extracting only the subject image surrounded by the body surface from the sectional images 400_X0 to 400_Xn. The body surface determining section 270 corresponds to an example of the image processing section according to the present invention.

In the body surface determining section 270, the high-density image surrounded by the pixels having a negative pixel value on each label image corresponding to the sectional images 400_X0 to 400_Xn is determined as a subject image by the series of processes. The boundary line formed by these pixels is determined as a body surface line indicating the body surface.

Also, the body surface extraction unit 200 includes an extracted image memory configured of a storage area having as many pixels as the sectional images 400_X0 to 400_Xn to store the new sectional images 400_X0' to 400_Xn' as the result of extracting the subject image from each of the sectional images 400_X0 to 400_Xn.

First, the pixel values of all the pixels making up the extracted image are initialized to a negative value.

Then, following the linear list of the label data, the pixel value of only the pixels inside the minimum rectangle in each high-density image is analyzed. As to the pixels for which the label number is set as a pixel value, a total of four pixels including two in X direction and two in Y direction in the original sectional image 400 Xm corresponding to the particular pixels are acquired, and the pixel value of each of the four pixels thus acquired is copied to the corresponding four pixels on the extracted image. Also, as to the pixels having a negative pixel value, only the pixels in contact with the subject area are acquired among the total of four pixels including two in X direction and two in Y direction in the original sectional image 400 Xm corresponding to the particular pixels, and the pixel value of each of the pixels thus acquired is copied to the corresponding pixel on the extracted image.

In the way described above, the pixel values in the extracted image are updated so that the new sectional images 400_X0' to 400_Xn' with the subject image extracted from the sectional images 400_X0 to 400_Xn are generated. The new sectional images 400_X0' to 400_Xn' thus generated are displayed on the display screen directly, or the disease portion estimated as the seed of the disease in the sectional images 400_X0' to 400_Xn' is automatically extracted and displayed in enlarged form.

According to this embodiment, the high-density image on the sectional images 400_X0 to 400_Xn is extracted to estimate the subject image two-dimensionally. At the same time, a series of high-density image groups with plural high-density images connected along Z direction are extracted, and the subject image is corrected based on the three-dimensional high-density image group. In the lung area low in image density, the subject image may be formed with a hole on the sectional image. By the three-dimensional analysis of the subject image, however, the area of the hole can be positively classified as the subject image group. Thus, the subject image group in the medical image can be accurately extracted.

Now, the explanation is over about the series of basic flow of the body surface extraction process executed by the body surface extraction unit 200 according to this embodiment.

Next, a detailed explanation is given about the painting algorithm used for painting each pixel in the boundary line with the label number by the two-dimensional labeling section 230.

Figure 10:
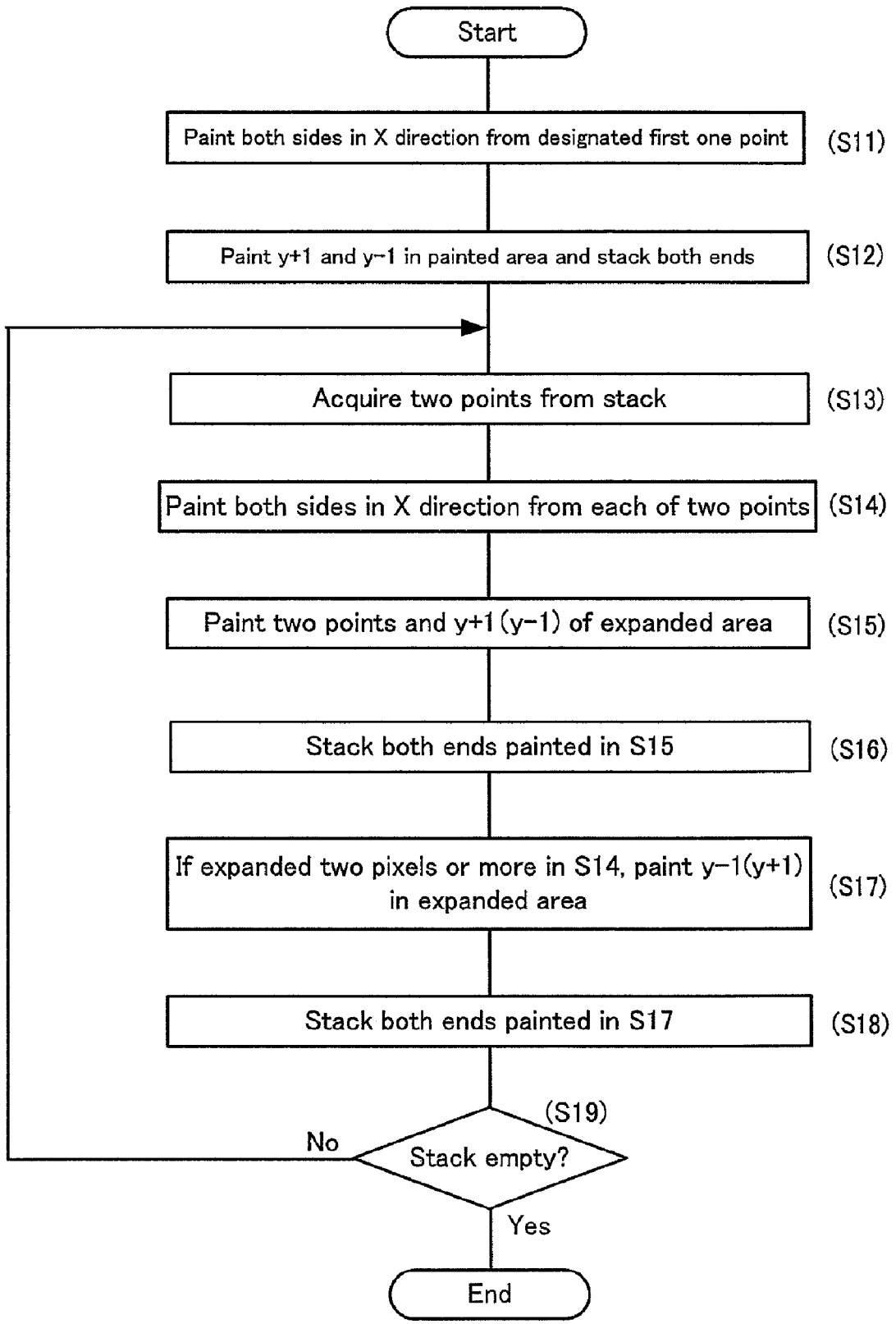
FIG. 10 is a flowchart showing the flow of the basic process of a painting algorithm.

FIG. 10 is a flowchart showing the basic process flow of the painting algorithm, and FIGS. 11 to 33 are diagrams showing the area painting process using the painting algorithm.

The algorithm shown in FIG. 10 is for painting the area surrounded by the contour line. In FIGS. 11 to 33, a total of 112 areas including seven areas in Y direction (vertical direction in the drawings) by 16 areas in X direction (horizontal direction in the drawings) are shown differently by hatching in plural painted states (the state in which the contour line is formed, the state before painting, the state in which the areas are already painted, the state in which the areas are to be newly painted, the state in which the positional information of the areas are stacked, or the state in which the positional information is acquired from the stack). In the description that follows, the area forming the contour line is referred to as area B, the area to be painted is area W, the area already painted as area Old, the area to be painted anew as area New, the area in which the positional information of the areas are stacked as area Stack and the area with the positional information acquired from the stack as area Get.

Figure 11:
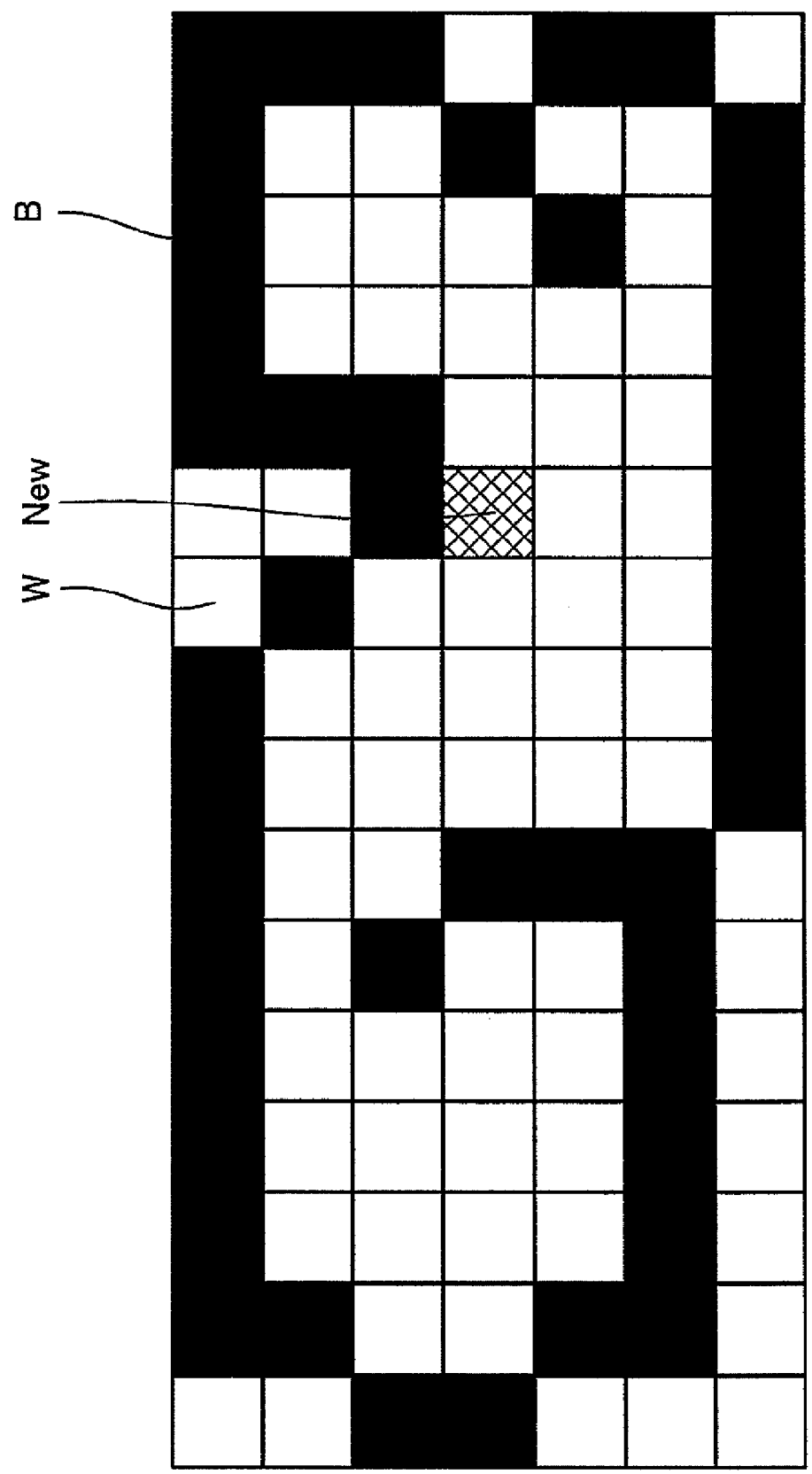
FIG. 11 is a diagram showing an initial stage of the process of painting an area using the painting algorithm.

FIG. 11 shows the processing state in the initial stage. First, area New to be painted anew is determined from the area W to be painted, and the particular area New is painted.

Figure 12:
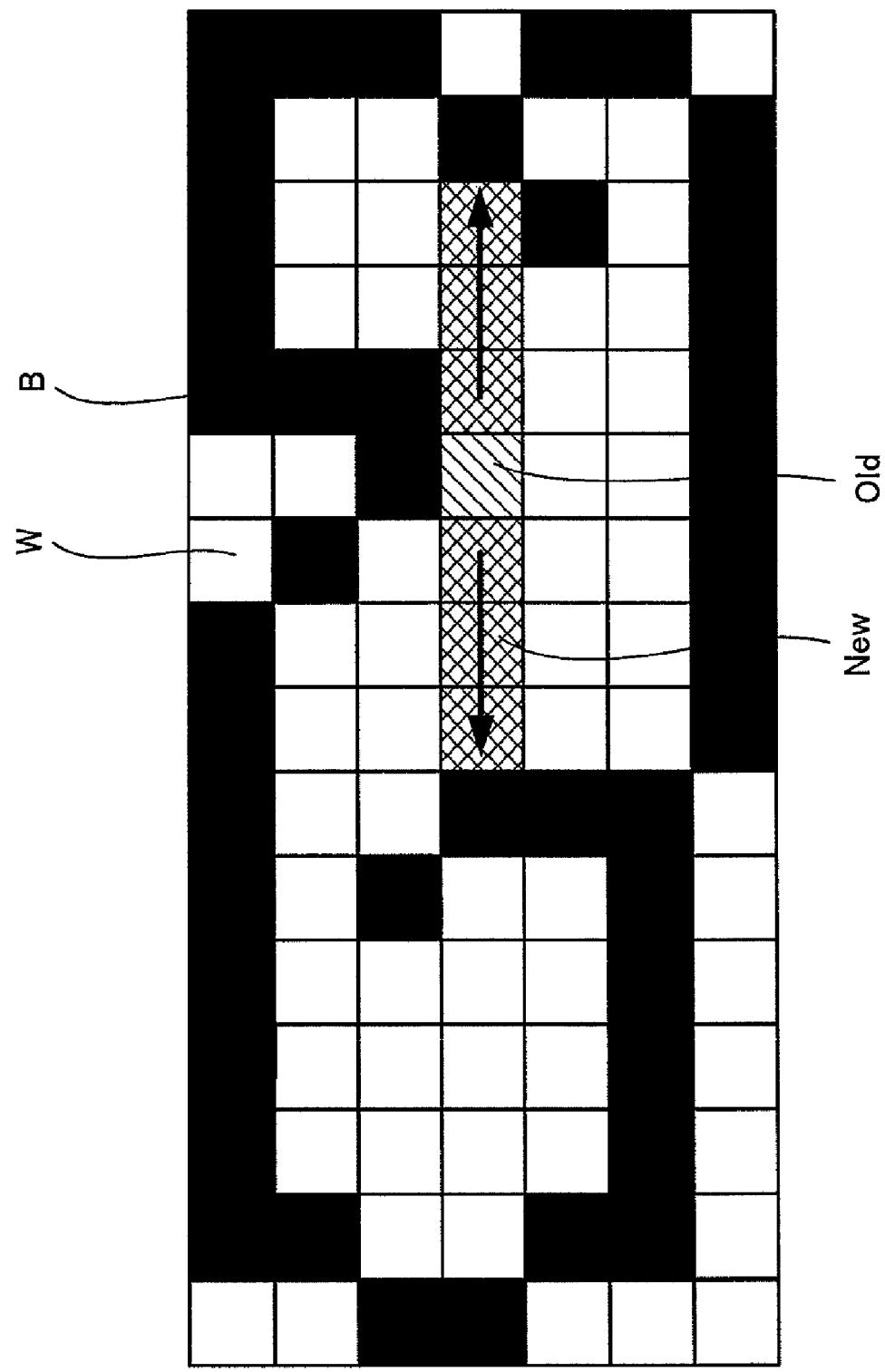
FIG. 12 is a diagram showing a first stage of the process of painting an area using the painting algorithm.

FIG. 12 shows the processing state in the first stage. In FIG. 12, the new area New shown in FIG. 11 is painted and changed as area Old painted already. From this area Old, the painting areas are expanded on both sides along X direction (step S11 in FIG. 10). In the case where area B forming the contour line is reached midway of expanding the painting areas, the painting is suspended at the area immediately before area B.

Figure 13:
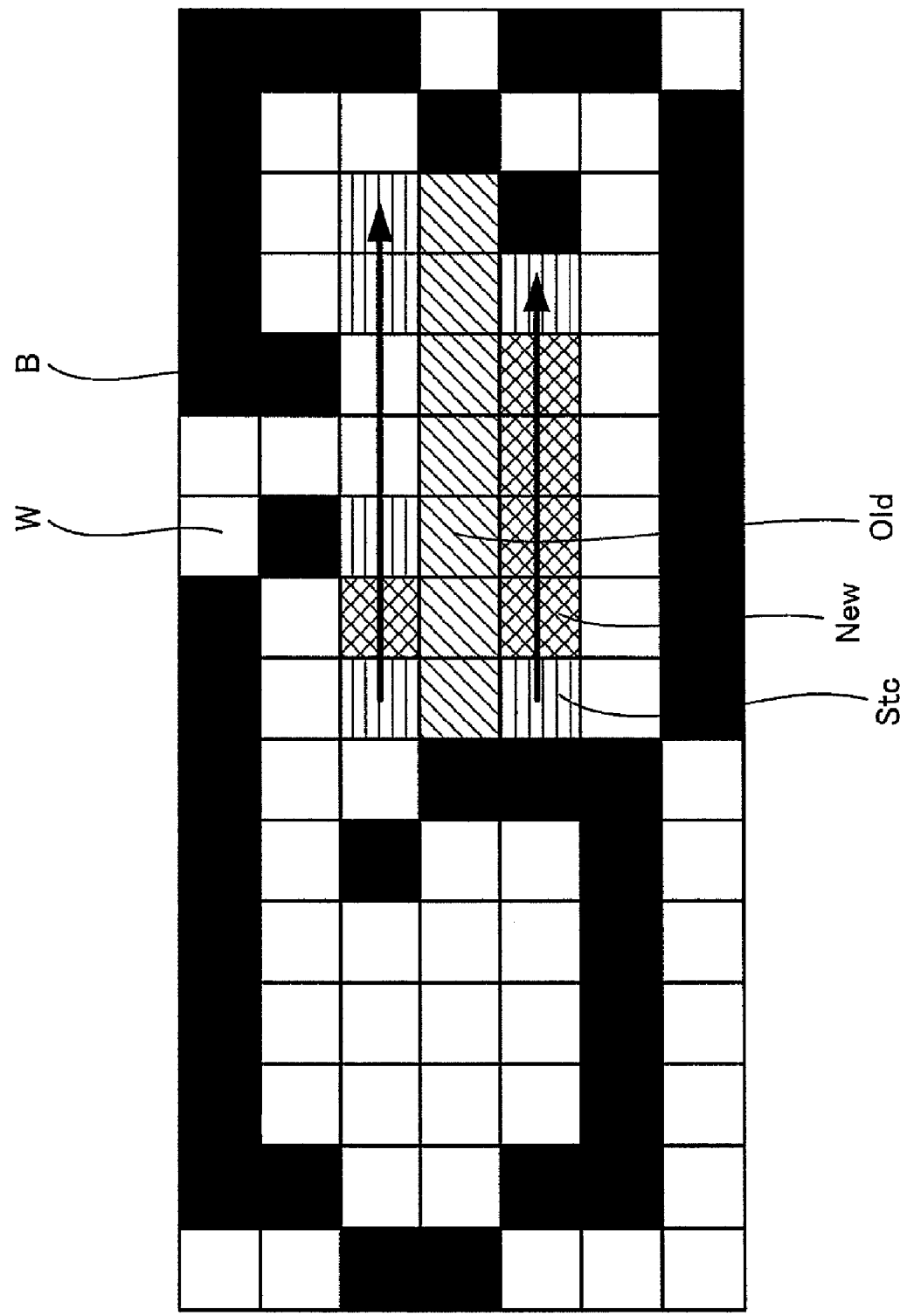
FIG. 13 is a diagram showing a second stage of the process of painting an area using the painting algorithm.

FIG. 13 shows the processing state in the second stage. The seven areas Old along X direction painted in the first stage shown in FIG. 12 and the 14(=7×2) areas New in contact therewith along Y direction are painted. Further, the positional information of each area Stack at the ends of the painted area New is stacked (step S12 in FIG. 10). According to this embodiment, two stacks are prepared, and assuming that the Y coordinate of areas Old is "y", the positional information of areas Stack corresponding to each end of the upper area New having the Y coordinate "y+1" is stacked as stack 1, while the positional information of area Stack corresponding to each end of the lower areas New and having the Y coordinate "y−1" is stacked as stack 2.

Figure 14:
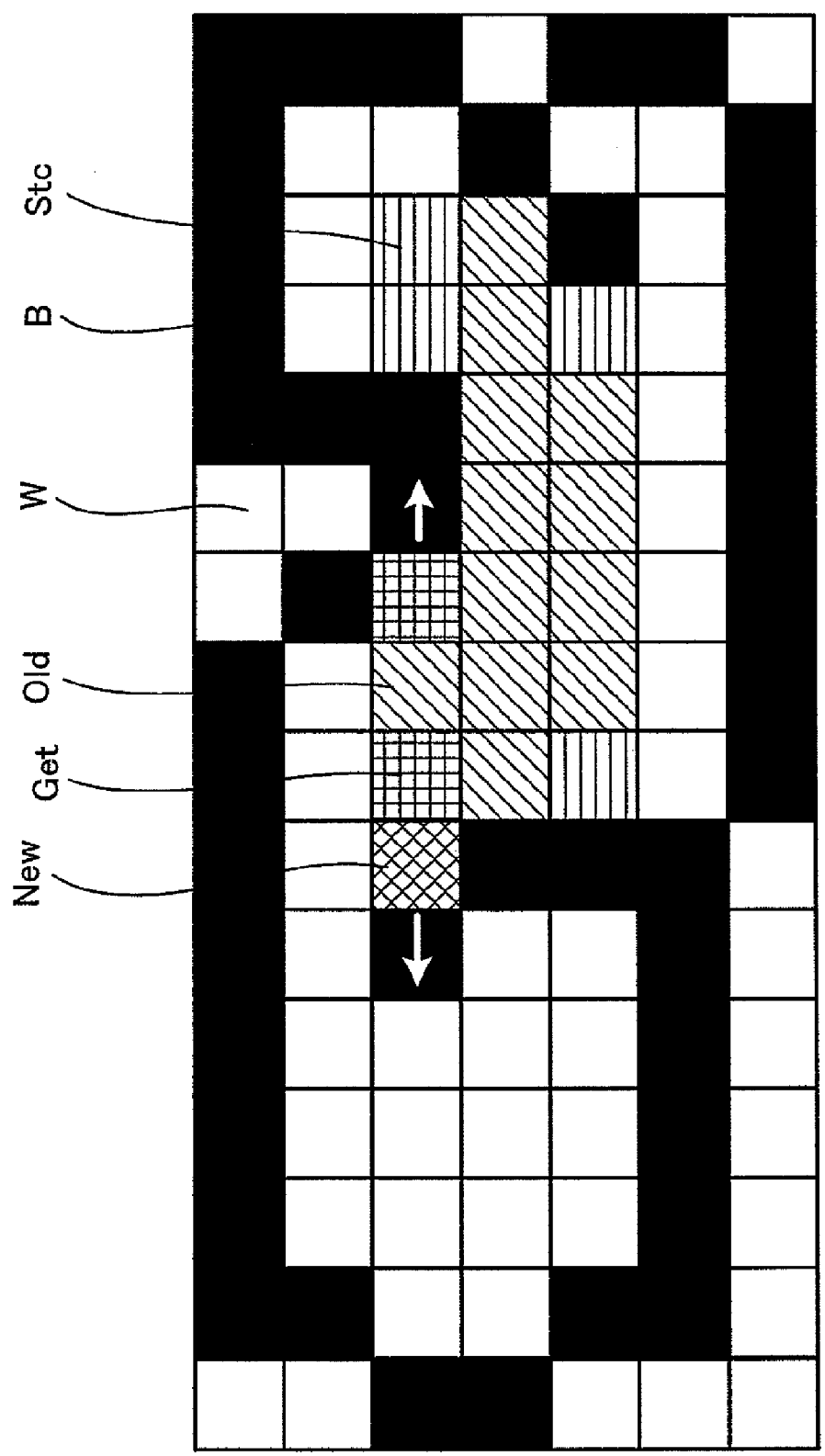
FIG. 14 is a diagram showing a third stage of the process of painting an area using the painting algorithm.

FIG. 14 shows the processing state in the third stage. Once the positional information of the areas are stacked as stacks 1 and 2, the positional information of the areas is obtained from one of stacks 1 and 2 (step S13 in FIG. 10). In this example, the positional information of the two areas Stack corresponding to the each ends of the upper area New shown in FIG. 13 are acquired from stack 1, and the two areas indicated by the two positional information thus acquired are set as areas Get. Further, the painting areas are expanded in two ways along X direction from each of the two areas Get (step S14 in FIG. 10). In the case of FIG. 14, the right area Get is interposed between area Old already painted and area B forming the contour line, and therefore, the painting area is not expanded beyond the right area Get, while one area New is painted leftward from the left area Get.

Figure 15:
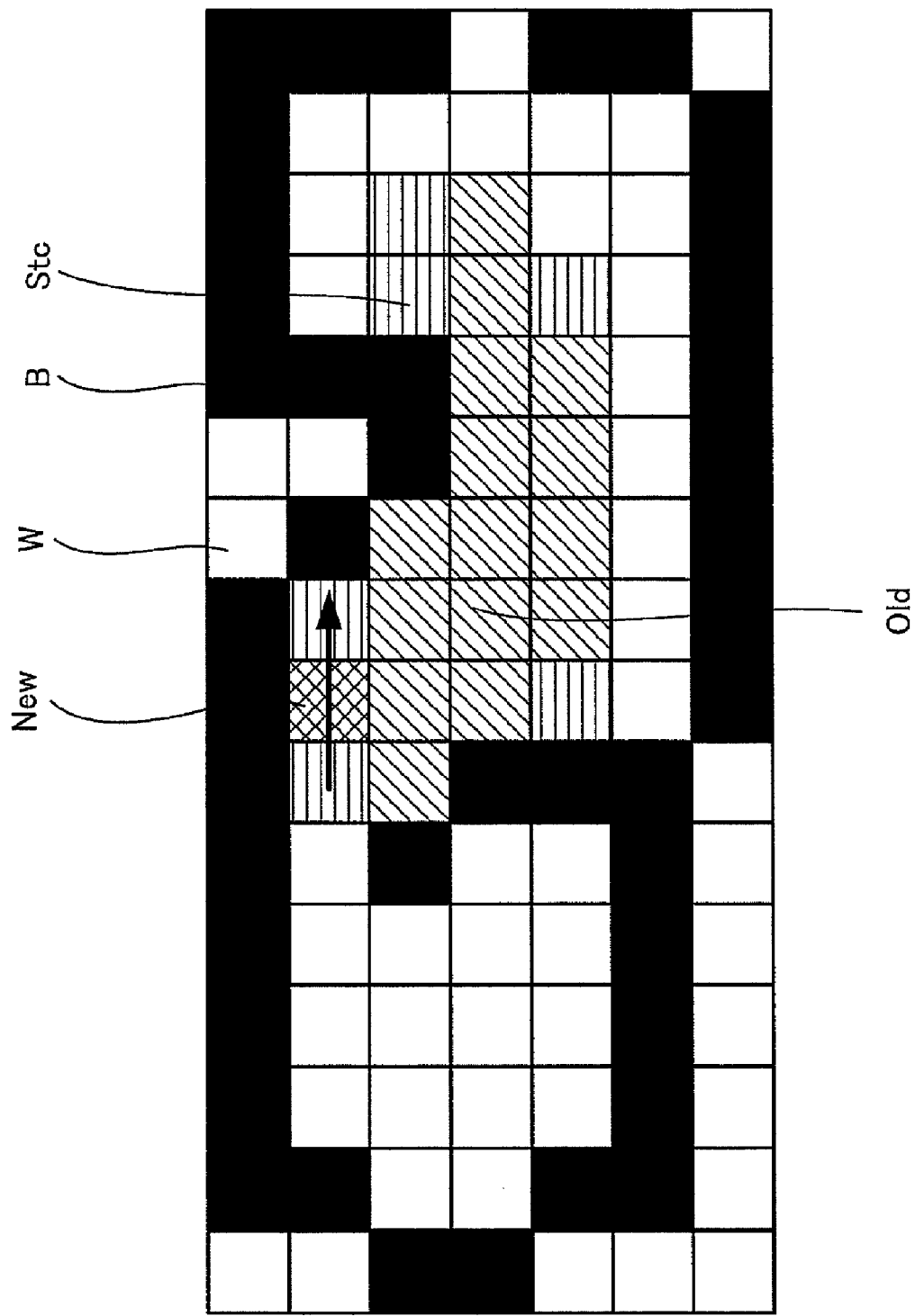
FIG. 15 is a diagram showing a fourth stage of the process of painting an area using the painting algorithm.

FIG. 15 shows the processing state in the fourth stage. The two areas Get forming the starting point of expansion of the painting range in the third stage shown in FIG. 14 and area New expanded by the two areas Get constitute areas Old already painted in FIG. 15. These areas Old and area New in contact therewith along Y direction are painted (step S15 in FIG. 10). Further, the positional information of area Stack at each end of the painted area New is stacked (step S16 in FIG. 10). In this case, the positional information is acquired from the stack 1 for storing the positional information of area Stack having the Y coordinate of "y+1" in step S13 shown in FIG. 14, and assuming that the Y coordinate of area Old is "y", therefore, the upper area New having the Y coordinate of "y+1" is painted in step S15, while the positional information is stored in stack 1 in step S16.

At the end of the fourth stage shown in FIG. 15, the painted areas are increased only one in step S14 shown in FIG. 14, but not two or more. Therefore, steps S17, S18 shown in FIG. 10 are omitted. At this time point, the positional information is stacked as stacks 1, 2 (NO in step S19 of FIG. 10), and therefore, the process is returned to step S13 and continued.

Figure 16:
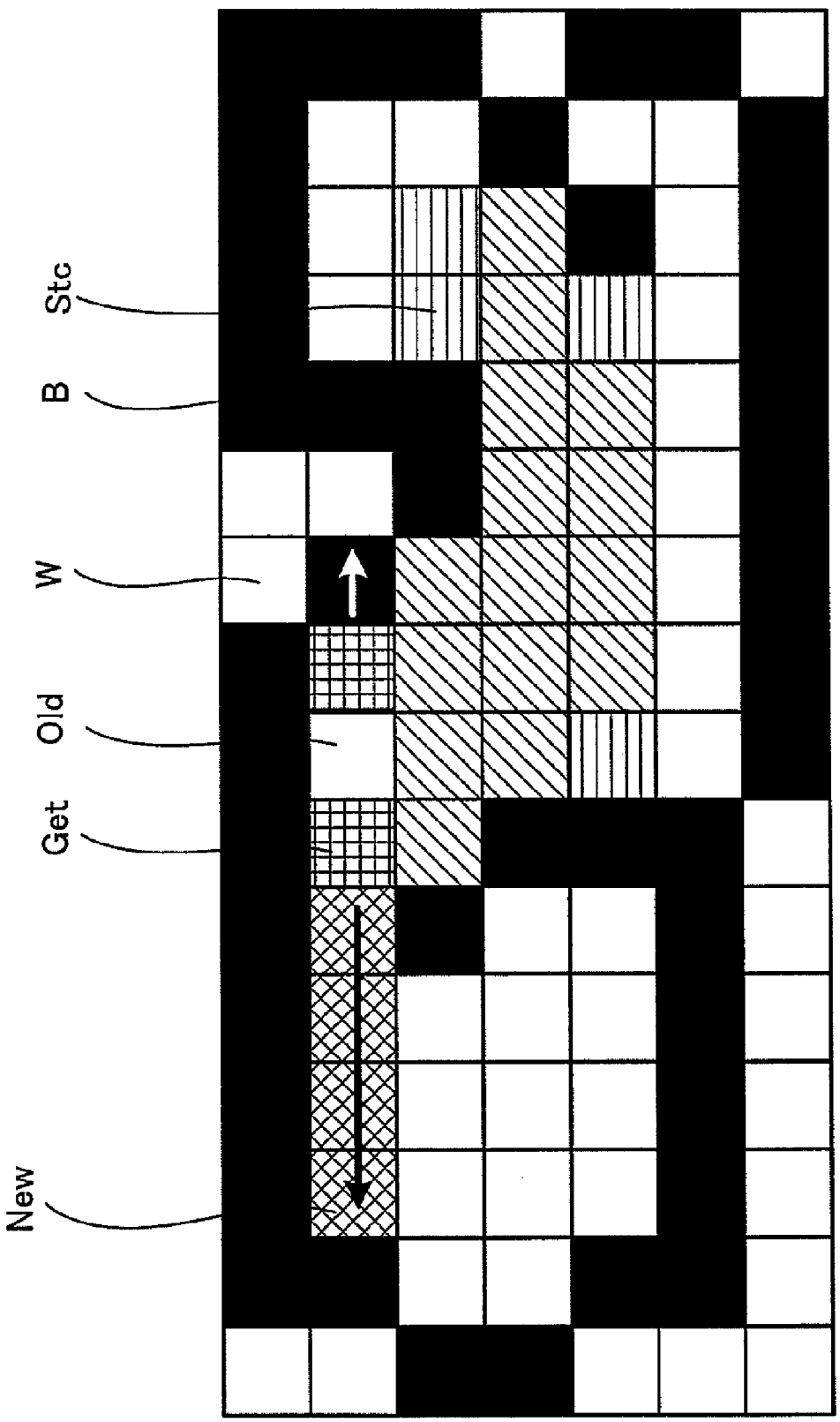
FIG. 16 is a diagram showing a fifth stage of the process of painting an area using the painting algorithm.

FIG. 16 shows the processing state in the fifth stage. From stack 1, the positional information of the upper two areas Stack shown in FIG. 15 are acquired (step S13 in FIG. 10), and from each of the two areas Get, the painting areas are expanded in both ways along X direction (step S14 in FIG. 10). In the case of FIG. 16, the four areas New are painted leftward from the left area Get.

Figure 17:
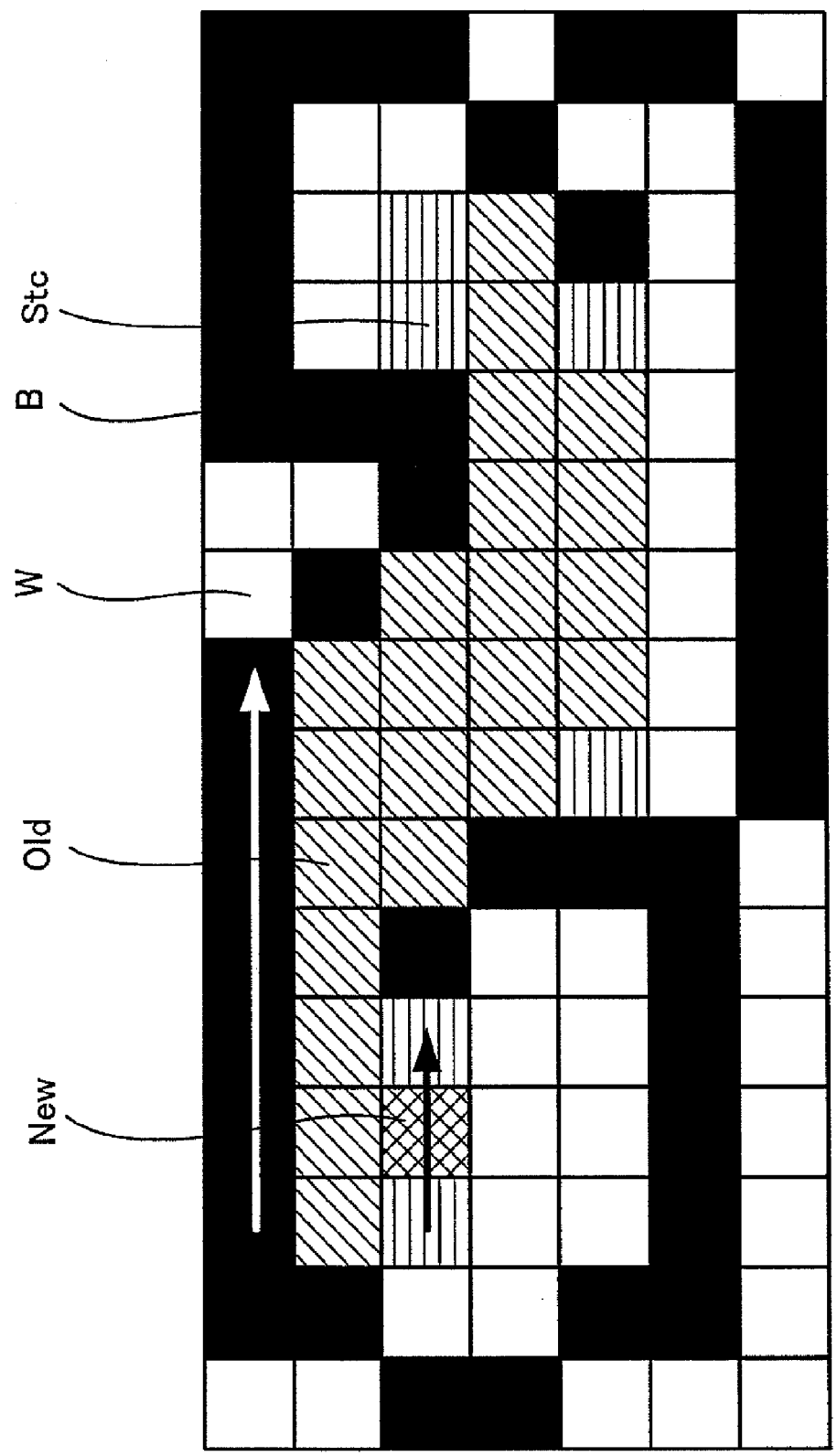
FIG. 17 is a diagram showing a sixth stage of the process of painting an area using the painting algorithm.

FIG. 17 shows the processing state in the sixth stage. The two areas Get and the four areas New in the fifth stage shown in FIG. 16 constitute the already painted areas Old, and assuming that the Y coordinate of areas Old is "y", the upper area New having the Y coordinate of "y+1" is painted (step S15 in FIG. 10). Thus, the positional information of area Stack at each end of area New are stored in stack 1 (step S16 in FIG. 10).

Since four painting areas are added by expansion in step S14 in the fifth stage shown in FIG. 16, area New in contact, along Y direction, with areas Old corresponding to the four expanded areas New is painted (step S17 in FIG. 10). Further, the positional information of area Stack at each end of the painted area New is stacked (step S18 in FIG. 10). In this case, the positional information is acquired from stack 1 in step S13 shown in FIG. 14, and assuming that the Y coordinate of area Old is "y", the upper area New having the Y coordinate of "y+1" is painted. In step S17, therefore, the lower area New having the Y coordinate of "y−1" is painted, and the positional information is stored as stack 2 in step S18.

A series of the process from steps S3 to S18 described above is repeated until the stacks 1, 2 become empty.

FIGS. 18 to 33 show the processing state in the seventh to 22nd stages, respectively.

Figure 18:
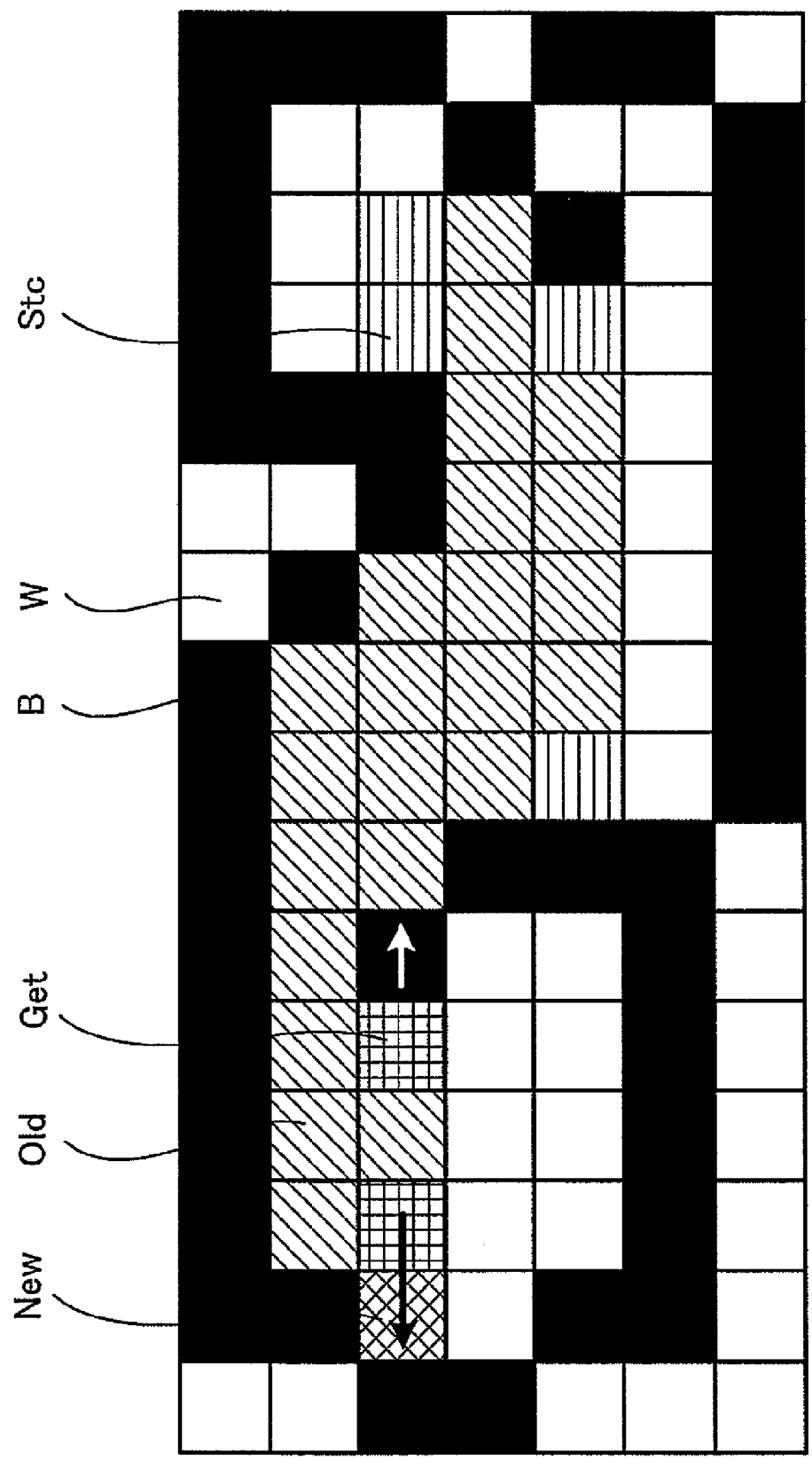
FIG. 18 is a diagram showing a seventh stage of the process of painting an area using the painting algorithm.

In the seventh stage shown in FIG. 18, the positional information stored in stack 2 in FIG. 17 is acquired (step S13 in FIG. 10), and one area New is painted leftward from the left one of the two areas Get (step S14 in FIG. 10).

Figure 19:
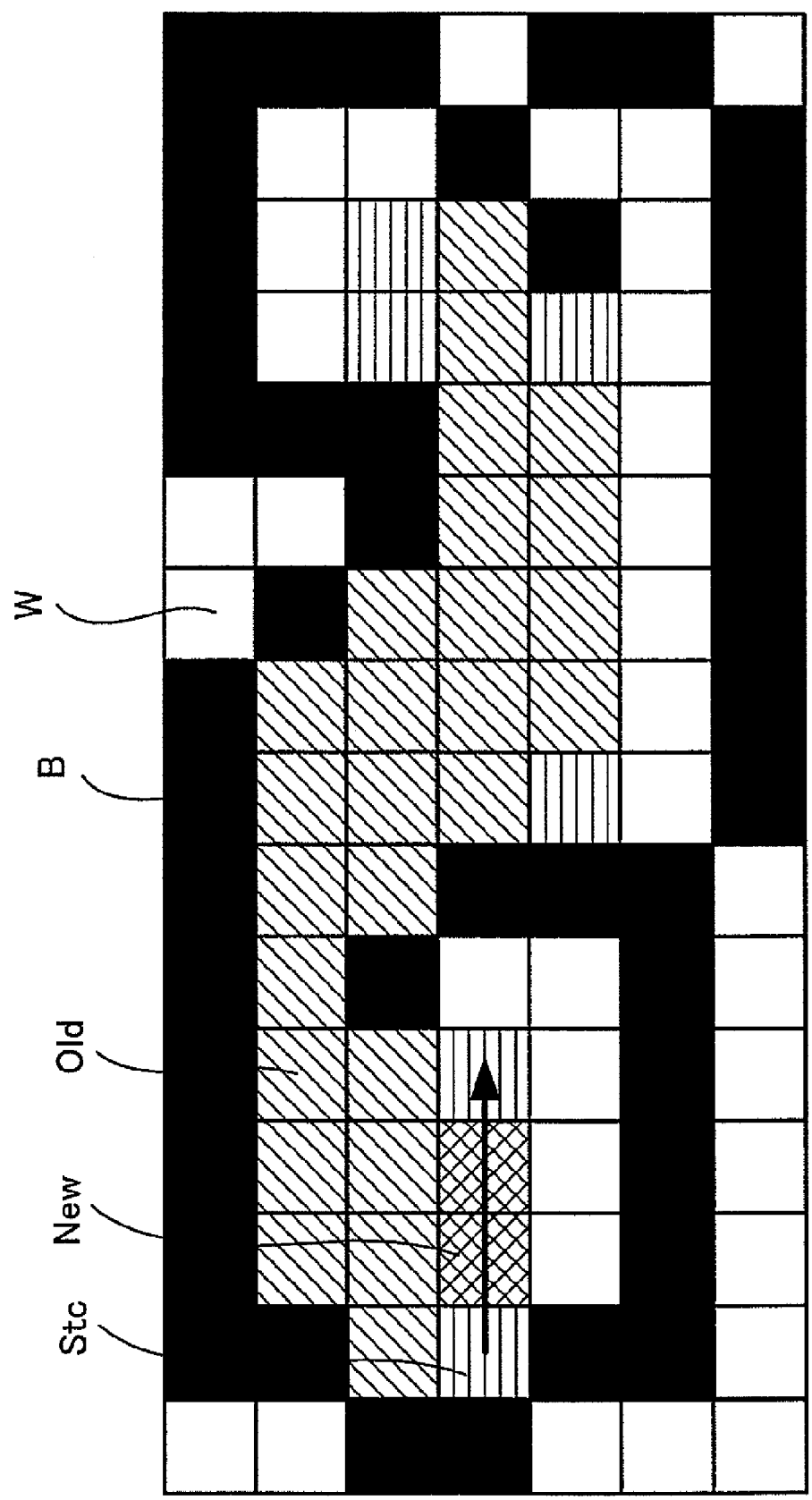
FIG. 19 is a diagram showing an eighth stage of the process of painting an area using the painting algorithm.

In the eighth stage shown in FIG. 19, two areas Get and one area New in FIG. 18 become areas Old, and assuming that the Y coordinate of areas Old is "y", the lower area New having the Y coordinate of "y−1" is painted (step S15 in FIG. 10), and the positional information of area Stack at each end of area New is stored in stack 2 (step S16 in FIG. 10).

Since only one painting area is added by expansion in step S14 in the fifth stage shown in FIG. 18, steps S17, S18 are omitted and the process returns to step S13.

Figure 20:
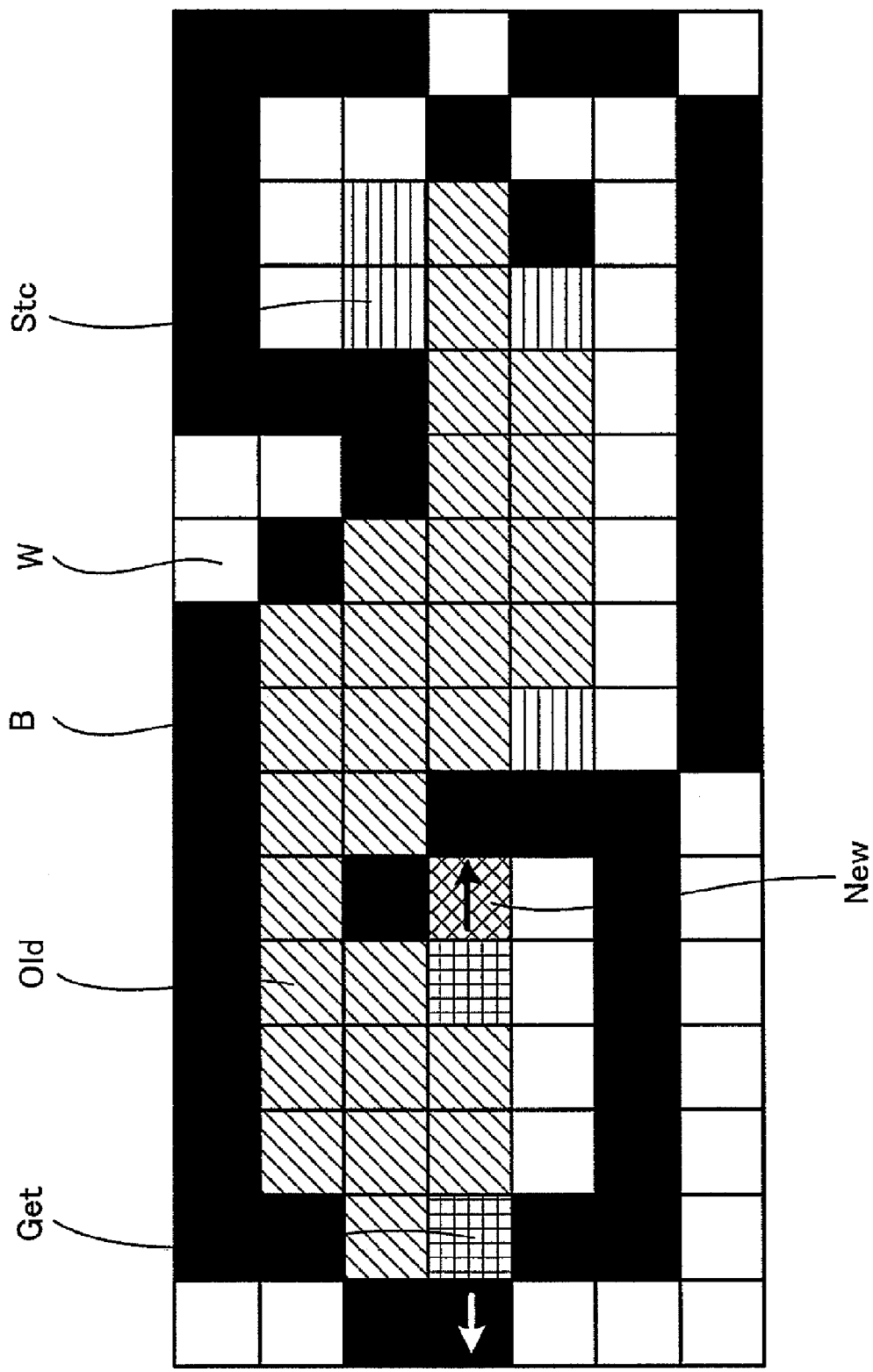
FIG. 20 is a diagram showing a ninth stage of the process of painting an area using the painting algorithm.

In the ninth stage shown in FIG. 20, the positional information stored in stack 2 in FIG. 19 is acquired (step S13 in FIG. 10), and one area New is painted rightward from the right one of the two areas Get (step S14 in FIG. 10).

Figure 21:
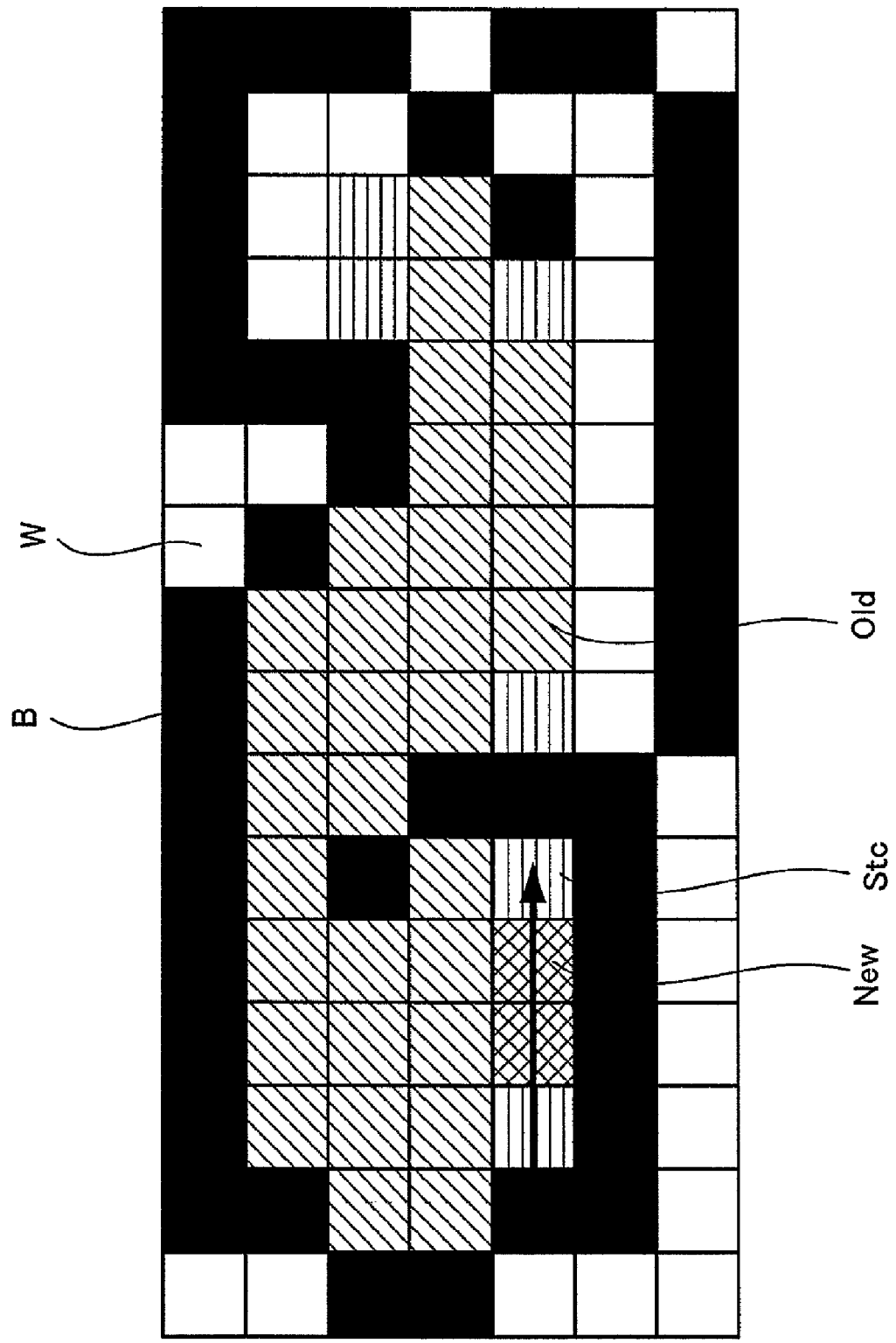
FIG. 21 is a diagram showing a tenth stage of the process of painting an area using the painting algorithm.

In the tenth stage shown in FIG. 21, two areas Get and one area New in FIG. 20 become areas Old, and assuming that the Y coordinate of areas Old is "y", the lower area New having the Y coordinate of "y−1" is painted (step S15 in FIG. 10), and the positional information of area Stack at each end of area New is stored in stack 2 (step S16 in FIG. 10).

Since only one painted area is added by expansion in step S14 in the ninth stage shown in FIG. 20, steps S17, S18 are omitted and the process returns to step S13.

Figure 22:
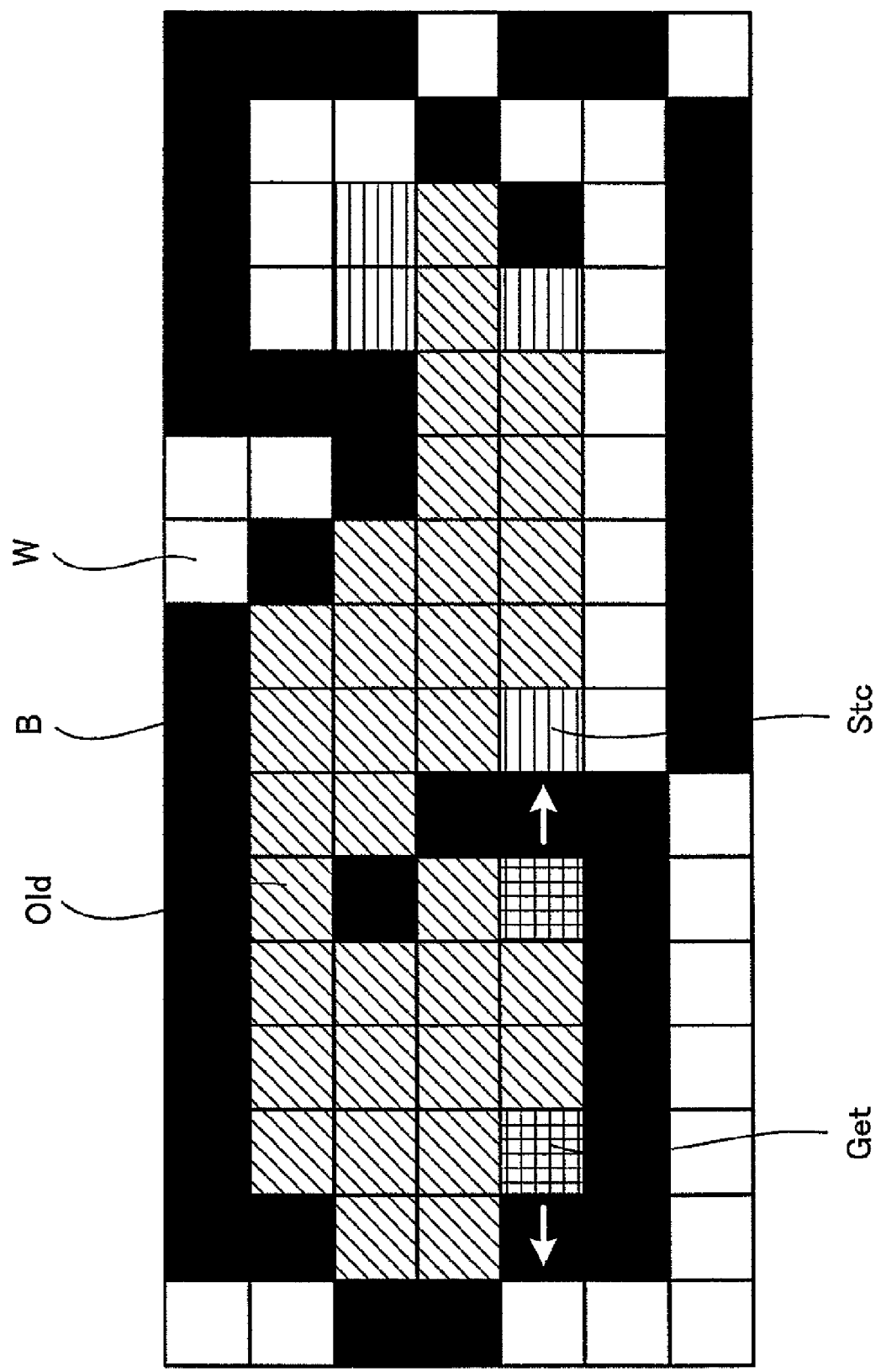
FIG. 22 is a diagram showing an 11th stage of the process of painting an area using the painting algorithm.
Figure 23:
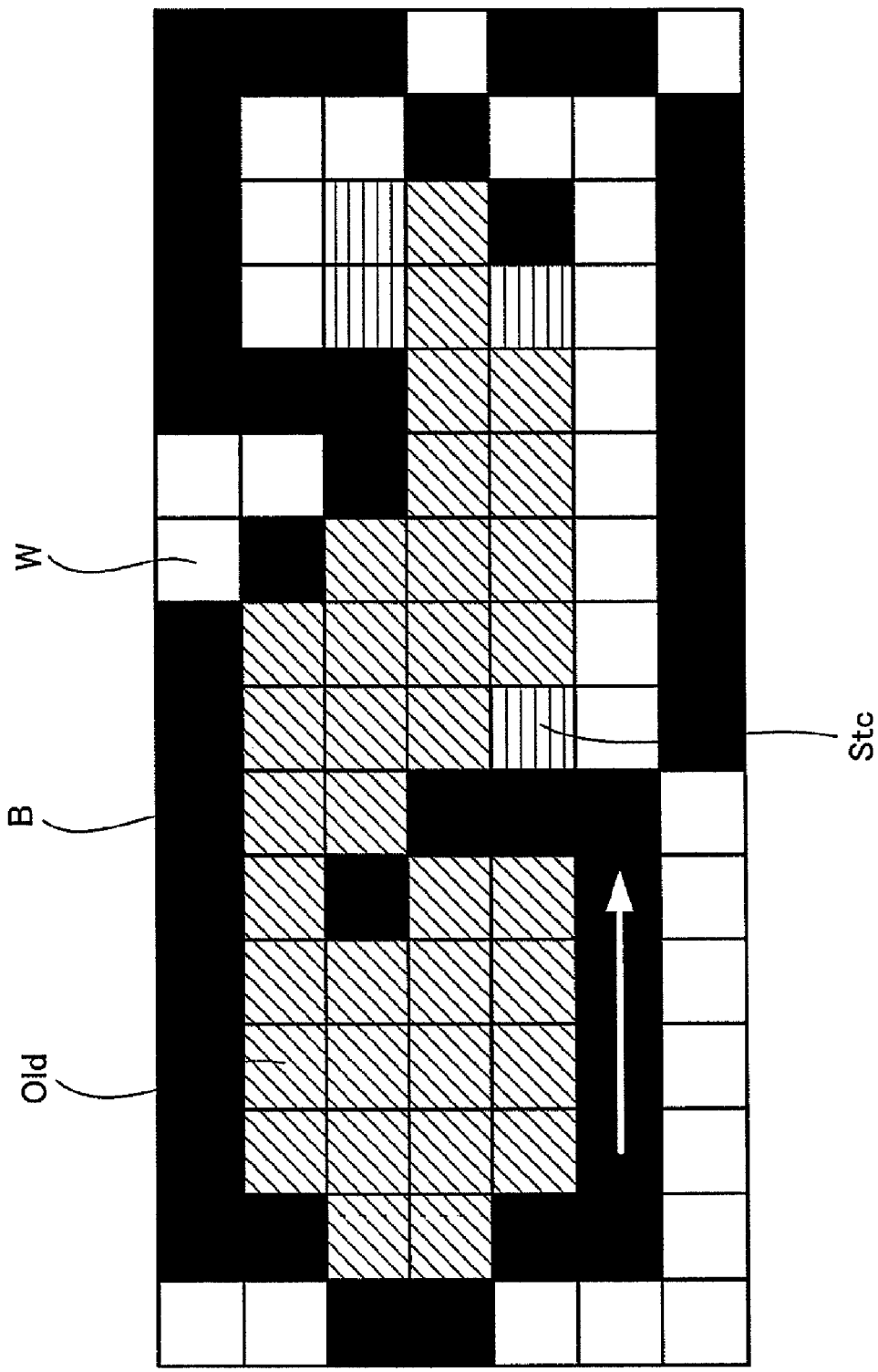
FIG. 23 is a diagram showing a 12th stage of the process of painting an area using the painting algorithm.

In the 11th stage shown in FIG. 22, the positional information stored in stack 2 in FIG. 21 is acquired (step S13 in FIG. 10). In the 12th stage shown in FIG. 23, however, the area to be painted is area B forming the contour line. Therefore, the area expansion is suspended (step S15 in FIG. 10), and no positional information is stacked (step S16 in FIG. 10).

Figure 24:
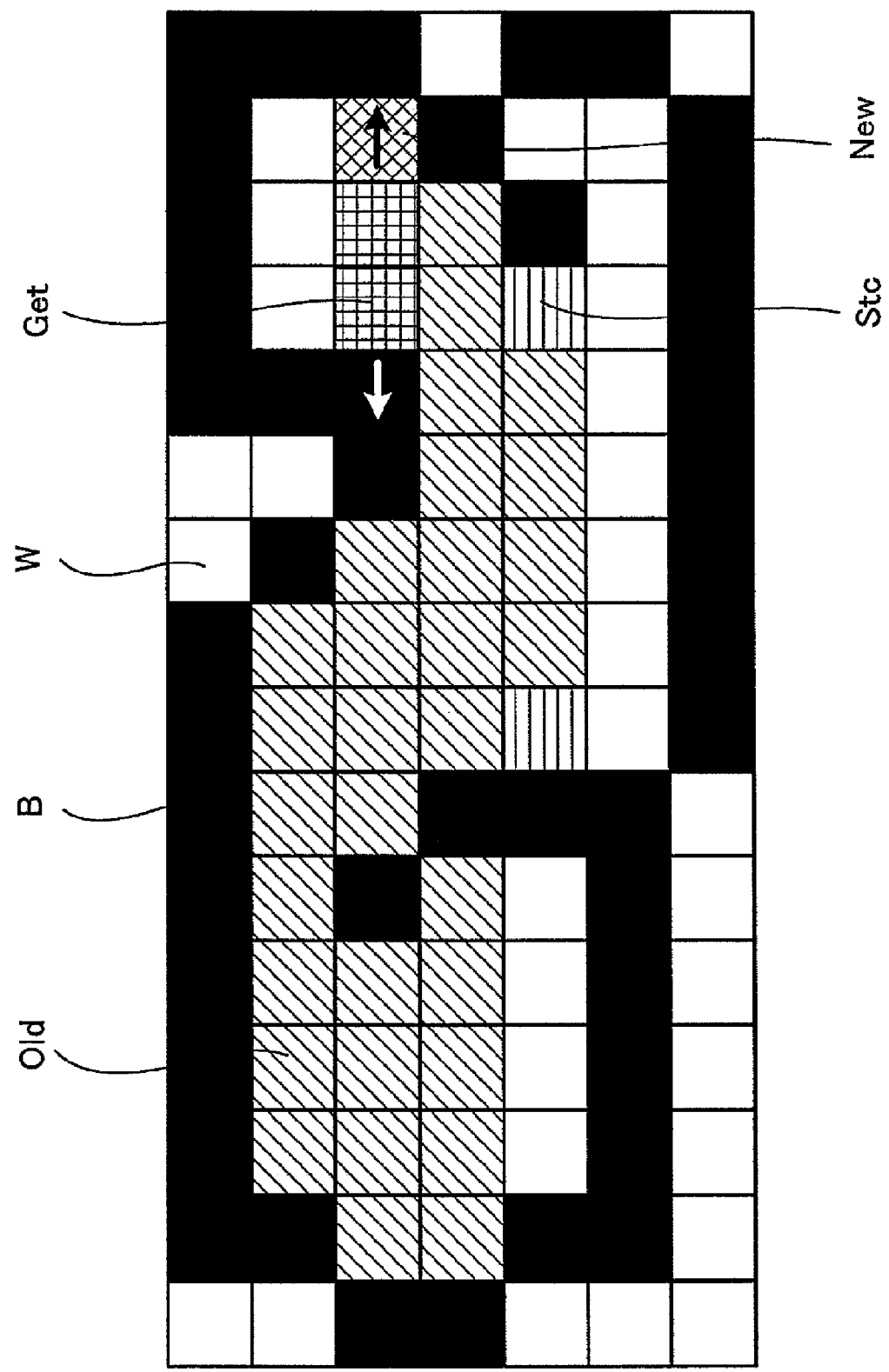
FIG. 24 is a diagram showing a 13th stage of the process of painting an area using the painting algorithm.

In the 13th stage shown in FIG. 24, the positional information stored in stack 1 in FIG. 13 is acquired (step S13 in FIG. 10), and one area New is painted rightward from the right one of the two areas Get (step S14 in FIG. 10).

Figure 25:
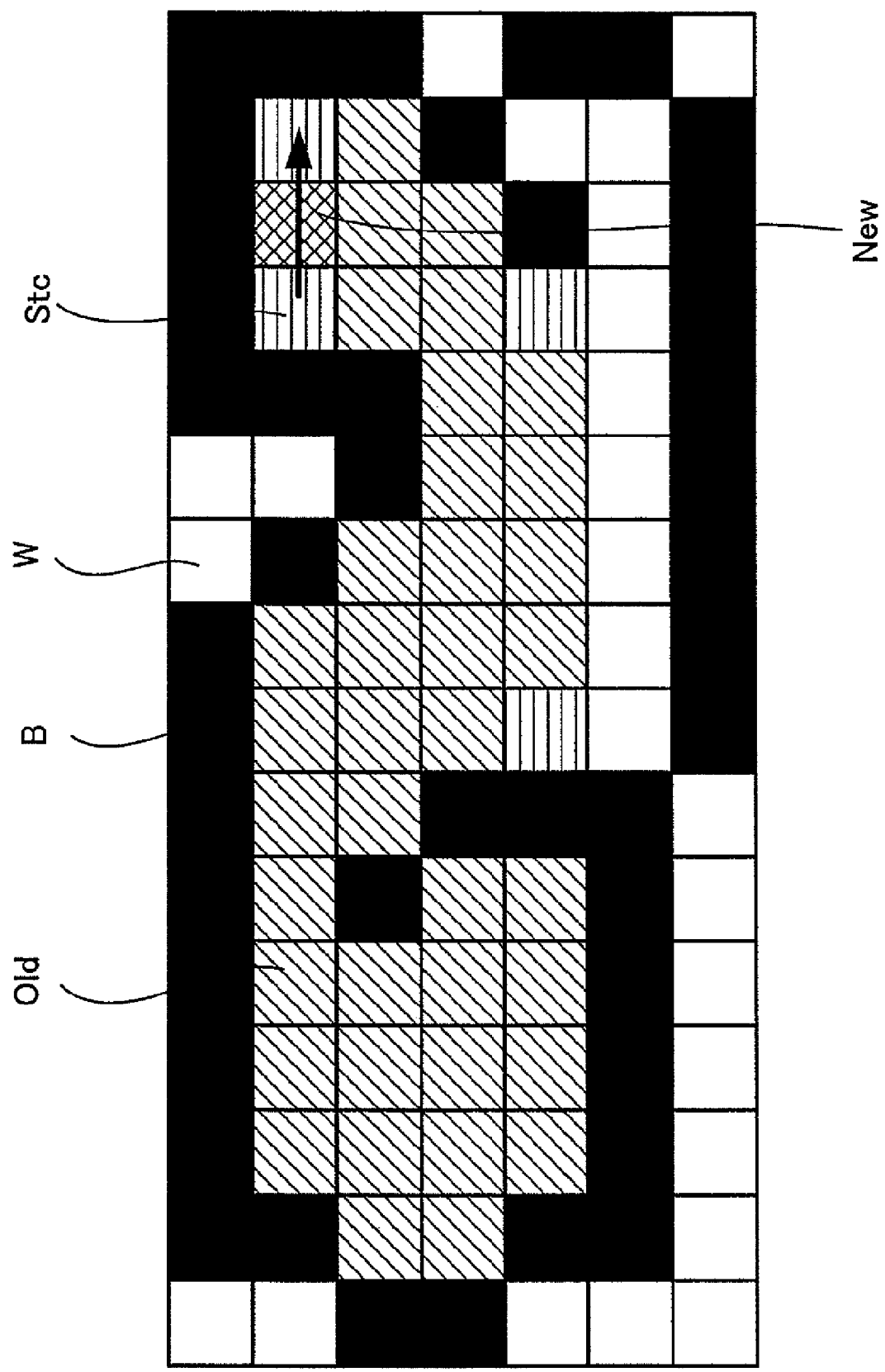
FIG. 25 is a diagram showing a 14th stage of the process of painting an area using the painting algorithm.

In the 14th stage shown in FIG. 25, two areas Get and one area New in FIG. 24 become areas Old, and assuming that the Y coordinate of area Old is "y", the upper area New having the Y coordinate of "y+1" is painted (step S15 in FIG. 10), and the positional information of area Stack at each end of area New is stored in stack 1 (step S16 in FIG. 10).

Figure 26:
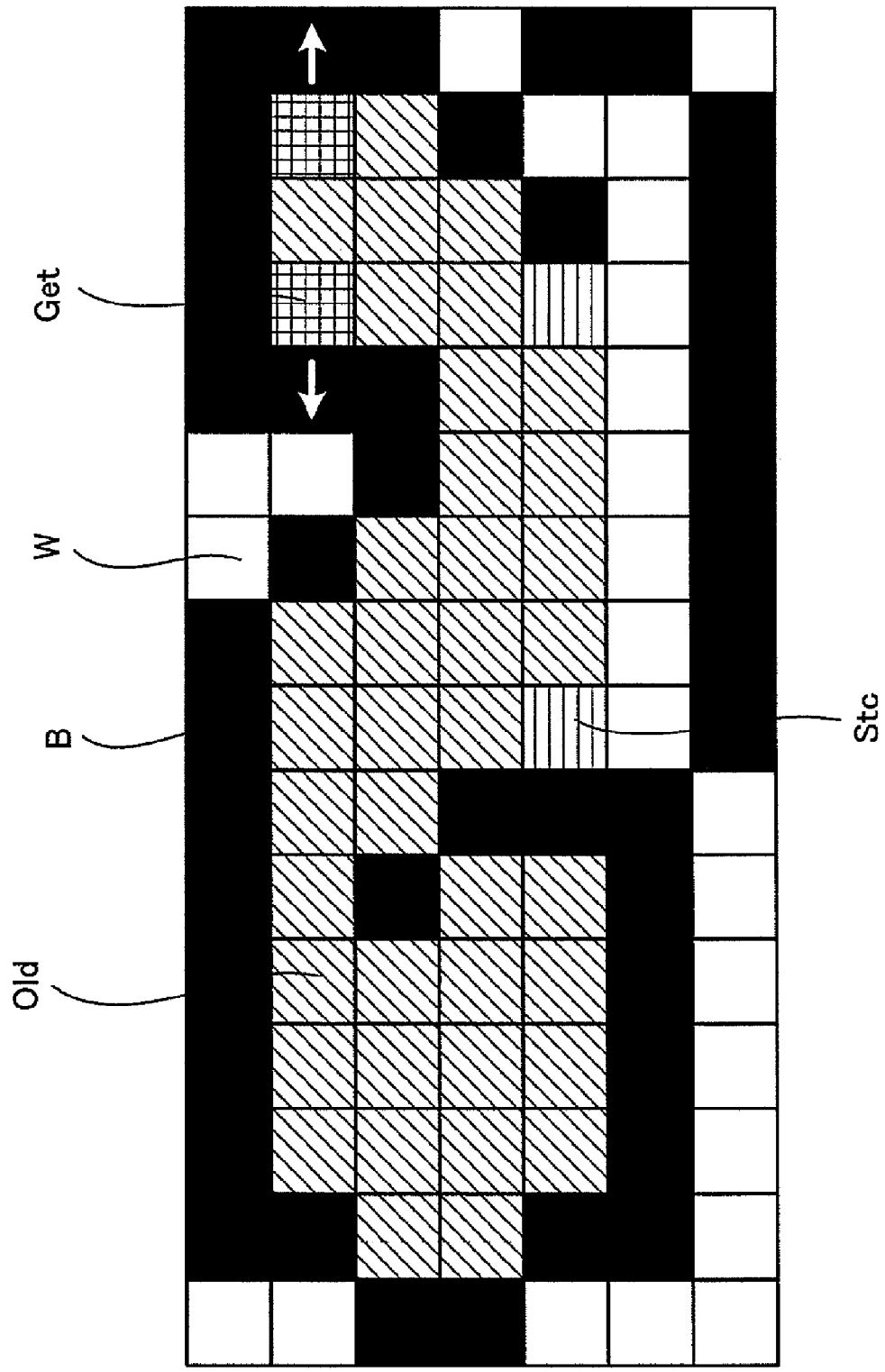
FIG. 26 is a diagram showing a 15th stage of the process of painting an area using the painting algorithm.
Figure 27:
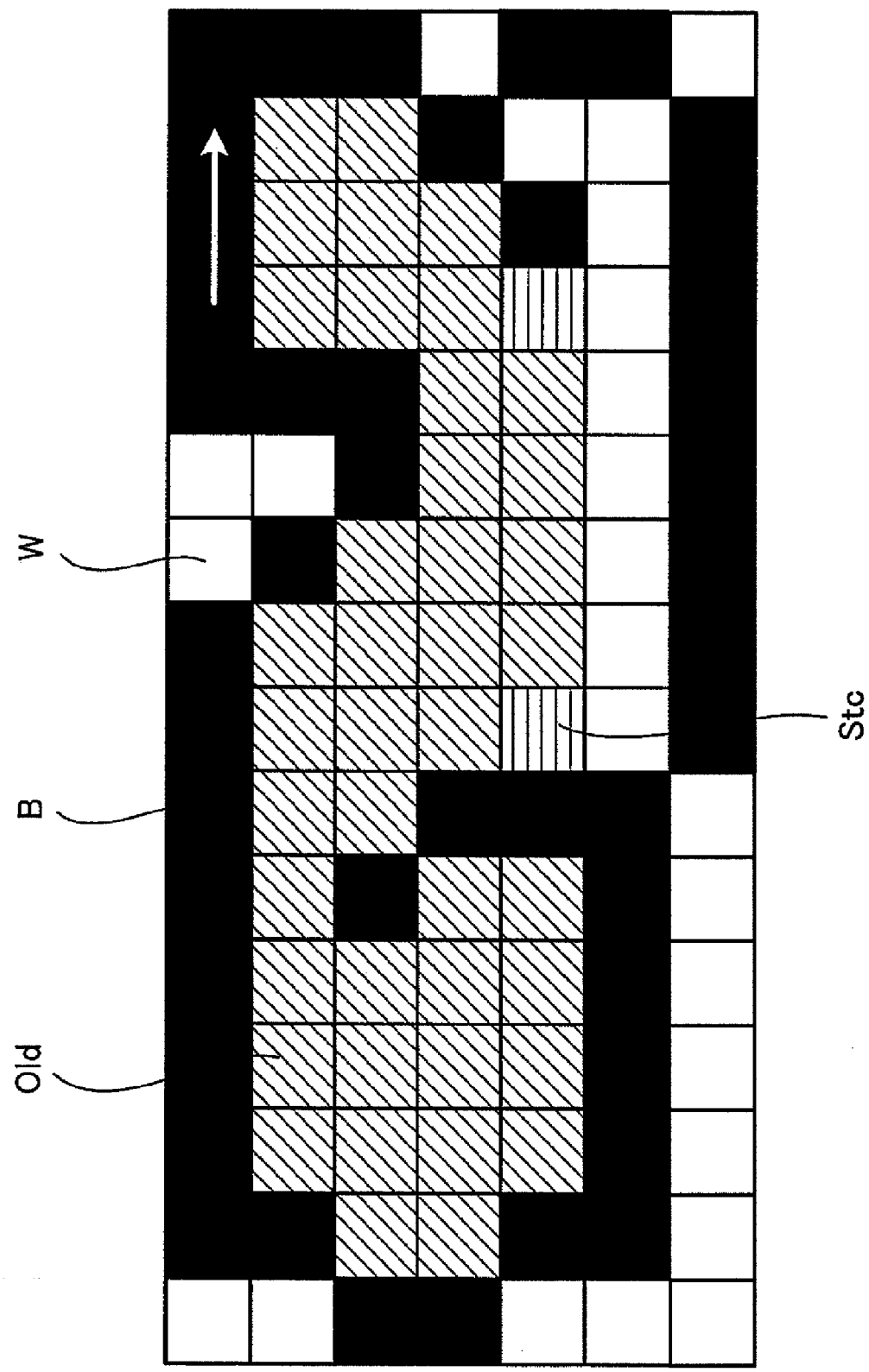
FIG. 27 is a diagram showing a 16th stage of the process of painting an area using the painting algorithm.

In the 15th stage shown in FIG. 26, the positional information stored in stack 1 in FIG. 25 is acquired (step S13 in FIG. 10). In the 16th stage shown in FIG. 27, however, the area to be painted is area B forming the contour line. Therefore, the area expansion is suspended (step S15 in FIG. 10), and no positional information is stacked (step S16 in FIG. 10).

Figure 28:
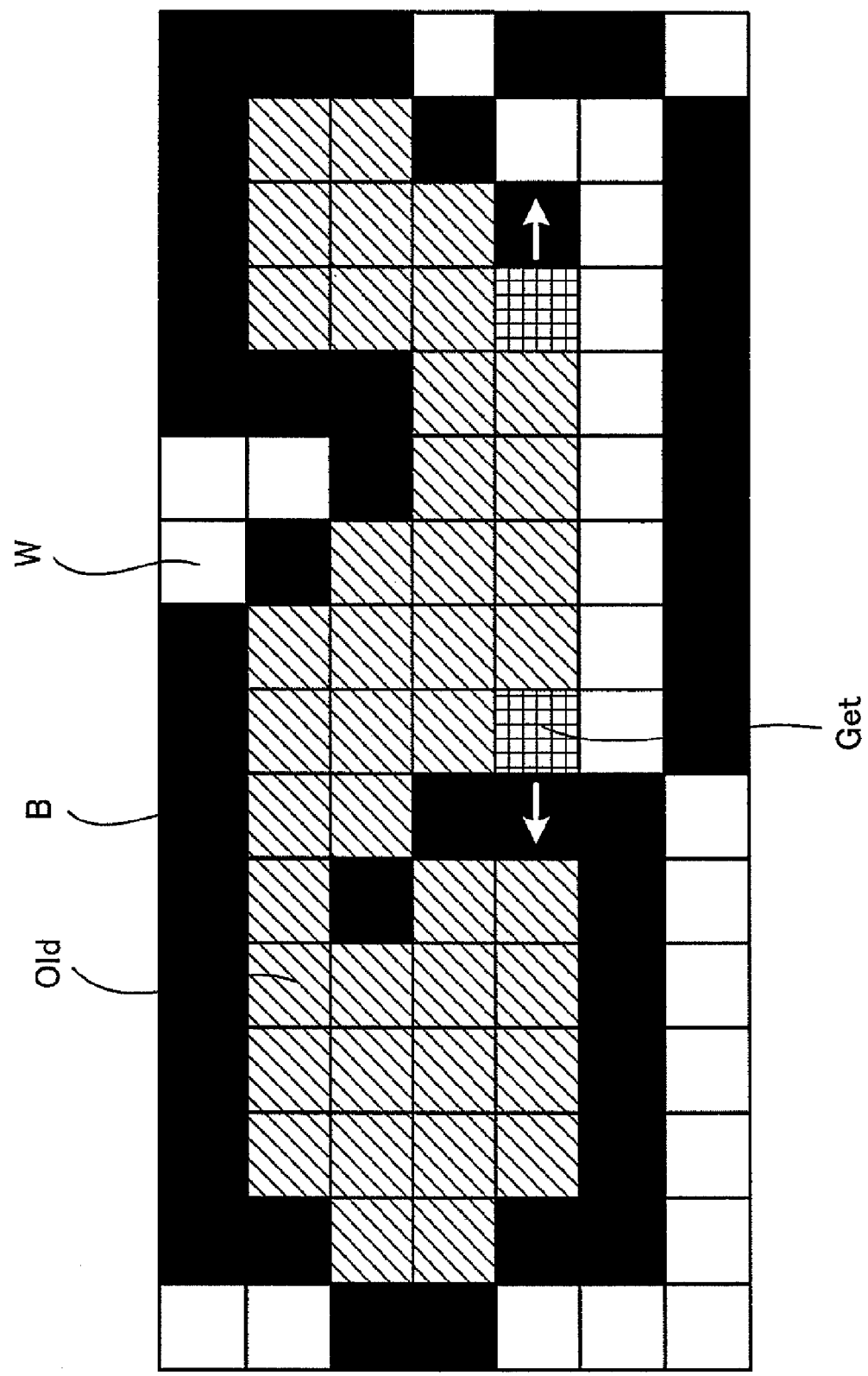
FIG. 28 is a diagram showing a 17th stage of the process of painting an area using the painting algorithm.

In the 17th stage shown in FIG. 28, the positional information stored in stack 2 in FIG. 13 is acquired (step S13 in FIG. 10). However, since two areas Get are interposed between area B forming the contour line and area Old already painted, no area is expanded (step S14 in FIG. 10).

Figure 29:
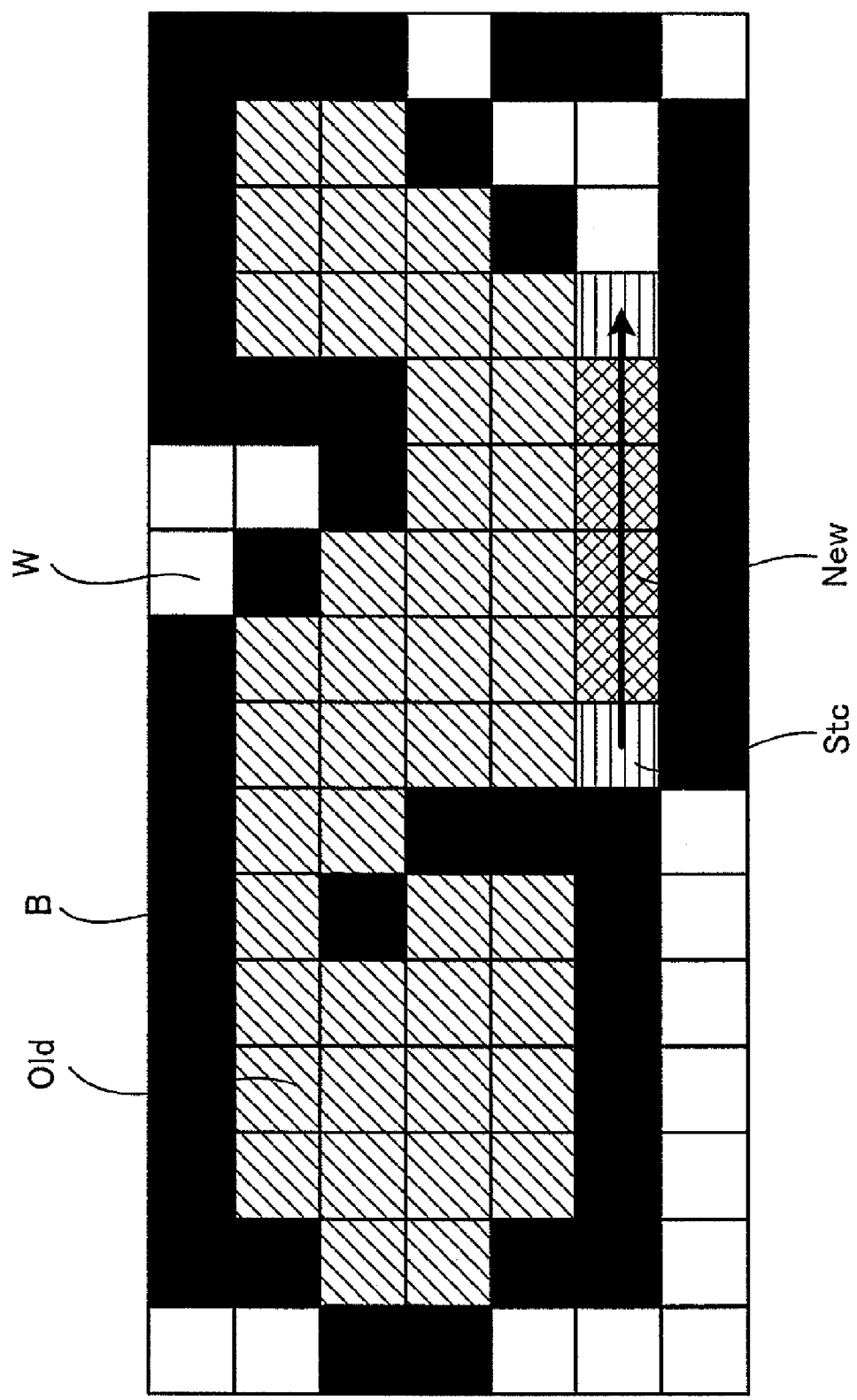
FIG. 29 is a diagram showing an 18th stage of the process of painting an area using the painting algorithm.

In the 18th stage shown in FIG. 29, two areas Get in FIG. 28 become areas Old, and assuming that the Y coordinate of area Old is "y", the lower five areas New having the Y coordinate of "y−1" are painted (step S15 in FIG. 10), and the positional information of area Stack at each end of areas New is stored in stack 2 (step S16 in FIG. 10).

Figure 30:
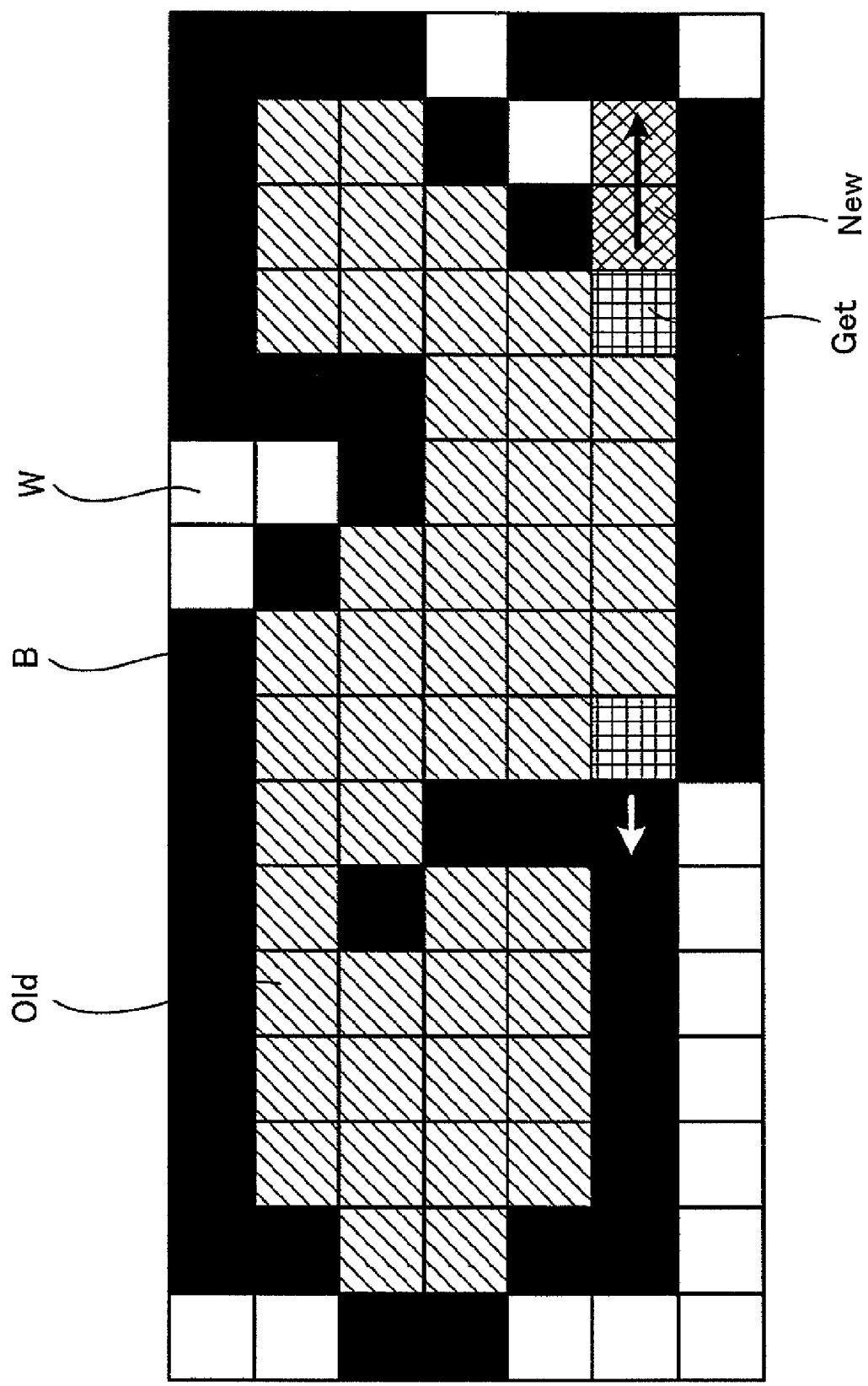
FIG. 30 is a diagram showing a 19th stage of the process of painting an area using the painting algorithm.

In the 19th stage shown in FIG. 30, the positional information stored in stack 2 in FIG. 29 is acquired (step S13 in FIG. 10), and two areas New are painted rightward from the right one of the two areas Get (step S14 in FIG. 10).

Figure 31:
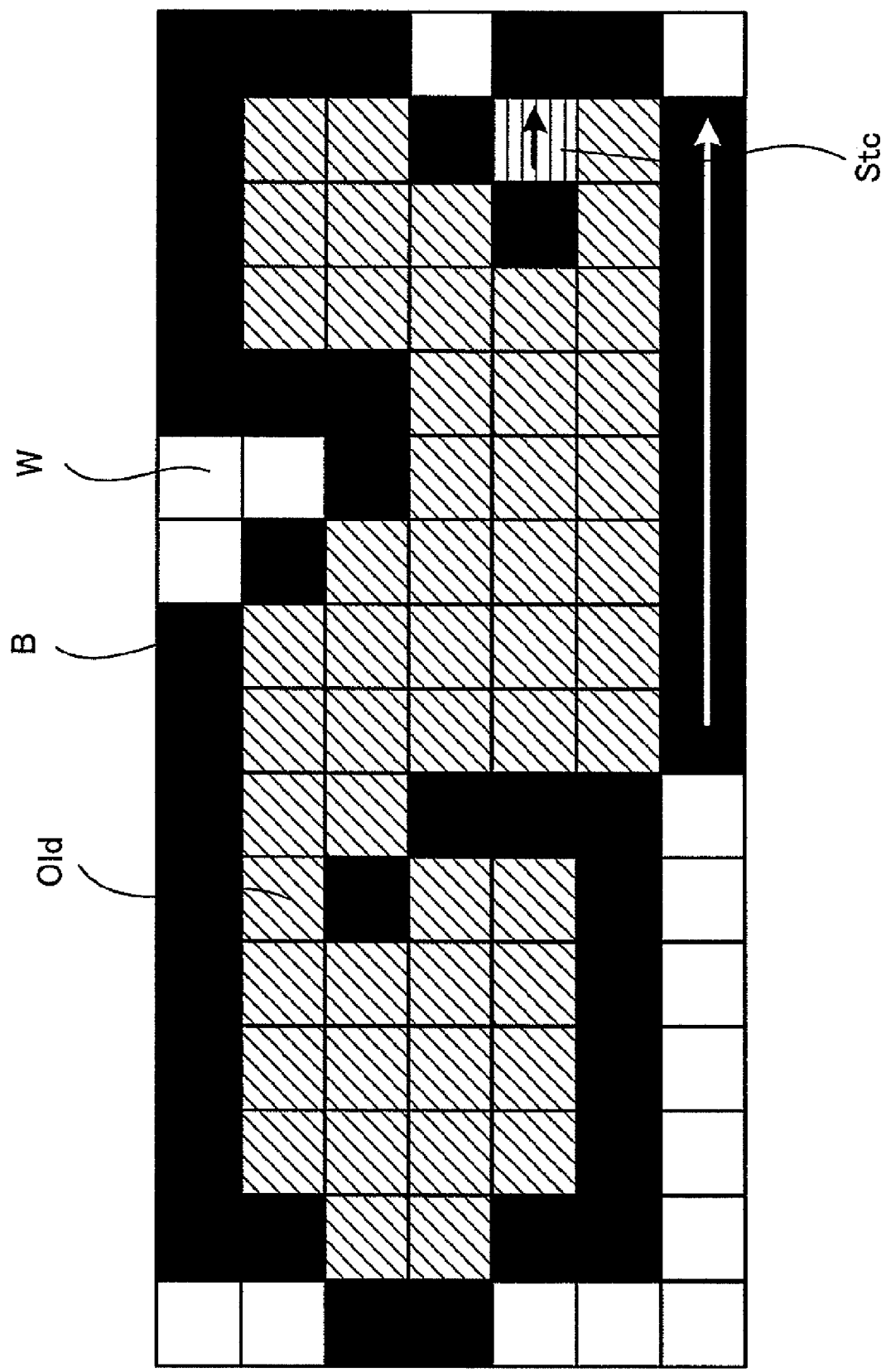
FIG. 31 is a diagram showing a 20th stage of the process of painting an area using the painting algorithm.

In the 20th stage shown in FIG. 31, two areas Get and two areas New in FIG. 30 become areas Old, and assuming that the Y coordinate of areas Old is "y", the upper area New having the Y coordinate of "y+1" is painted into area Stack (step S15 in FIG. 10). Then, the positional information of area Stack is stored in stack 1 (step S16 in FIG. 10).

Figure 32:
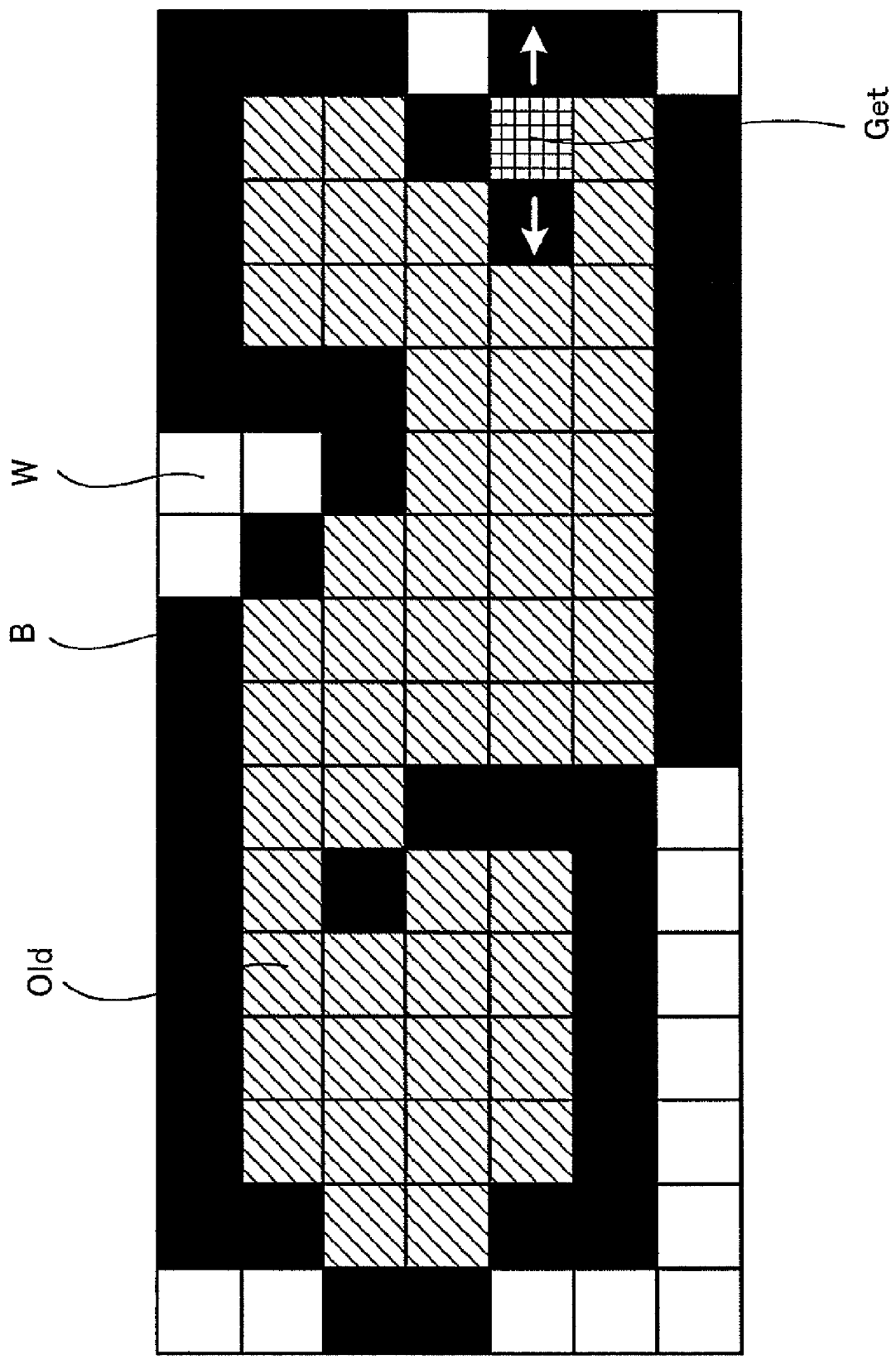
FIG. 32 is a diagram showing a 21st stage of the process of painting an area using the painting algorithm.
Figure 33:
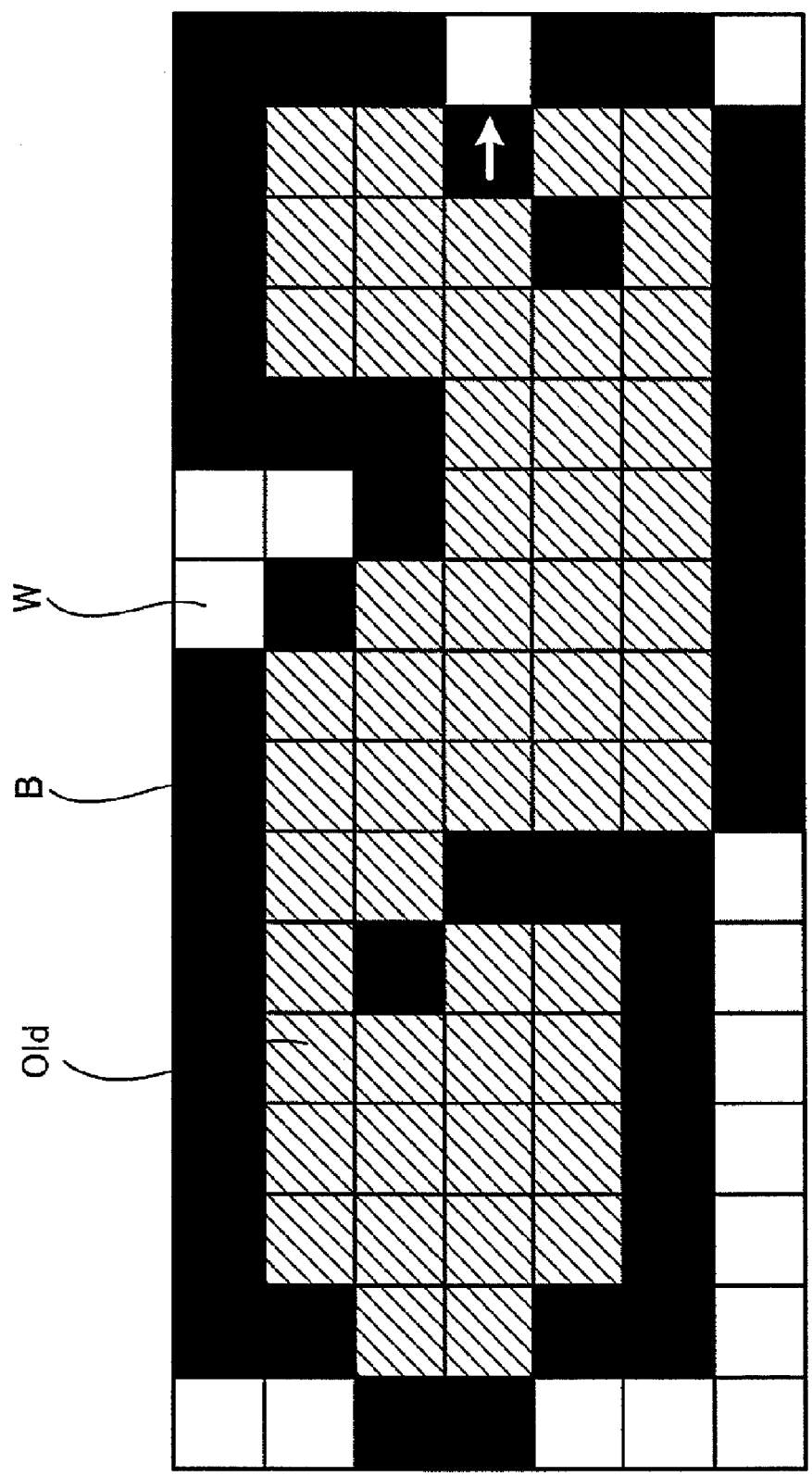
FIG. 33 is a diagram showing a 22nd stage of the process of painting an area using the painting algorithm.

In the 21st stage shown in FIG. 32, the positional information stored in stack 1 in FIG. 31 is acquired (step S13 in FIG. 10). In the 22nd stage shown in FIG. 33, however, the area to be painted is area B forming the contour line. Therefore, the area expansion is suspended (step S15 in FIG. 10), and no positional information is stacked (step S16 in FIG. 10).

At this time point, all the positional information are retrieved and stacks 1, 2 are empty, and all the areas surrounded by the area B forming the contour line are painted.

By utilizing this painting algorithm, the wasteful process judging the advisability of painting the same area a number of times is saved, and the processing time is shortened.

Now, a specific processing result in this embodiment is explained.

Figure 34:
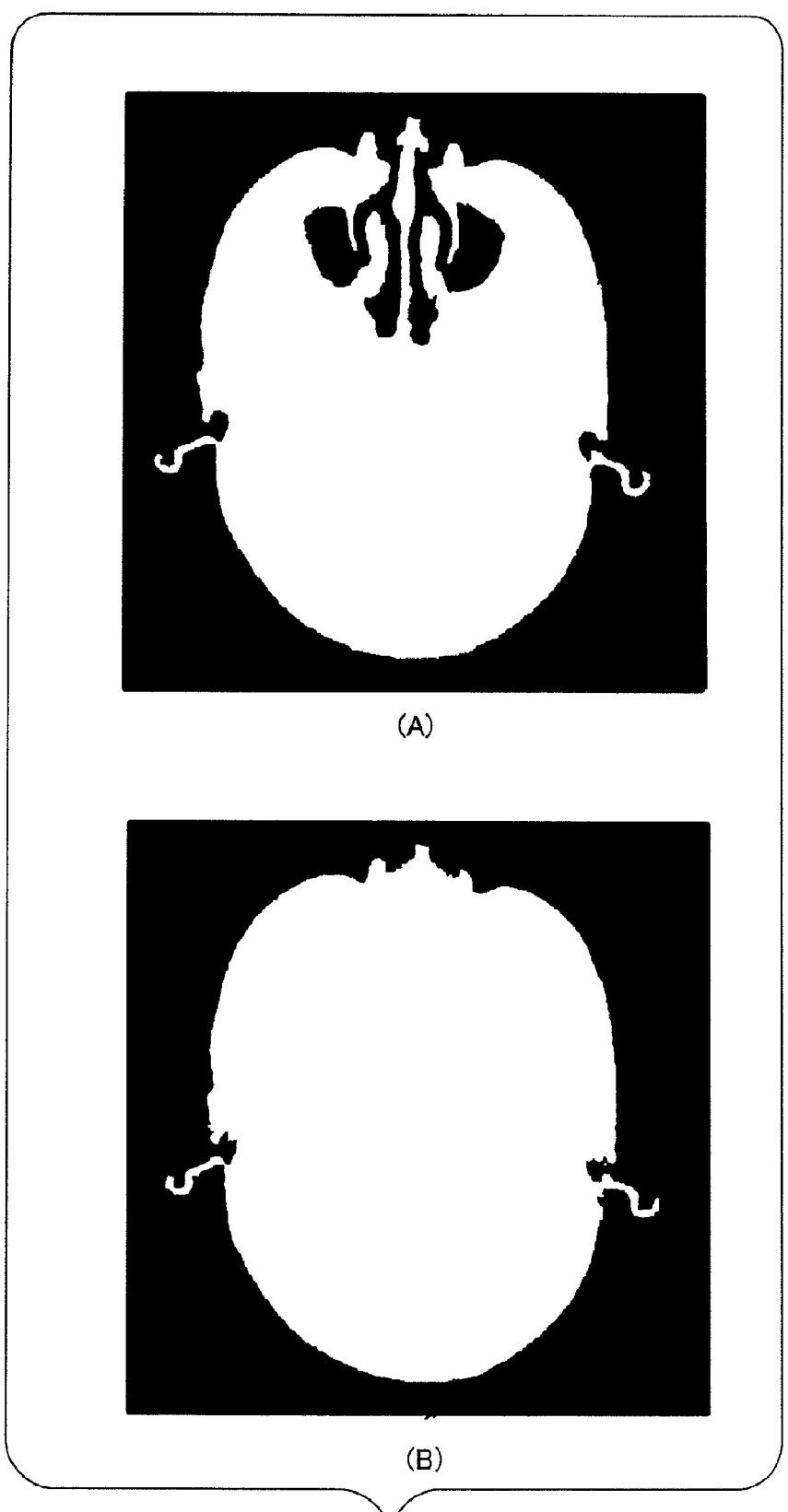
FIG. 34 is a diagram showing a subject image extracted on the sectional image at the position of the nose of the subject.

FIG. 34 is a diagram showing a subject image extracted on the sectional image at the position of the nose of the subject.

Figure 35:
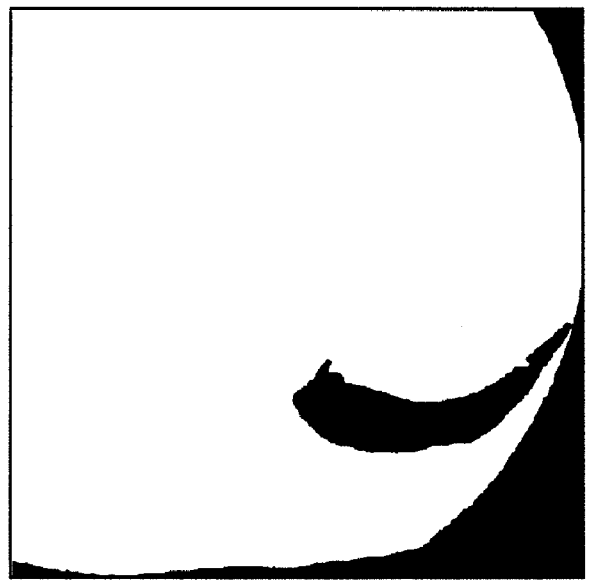
FIG. 35 is a diagram showing a subject image extracted on the sectional image at the position of the lung of the subject.
Figure 35:
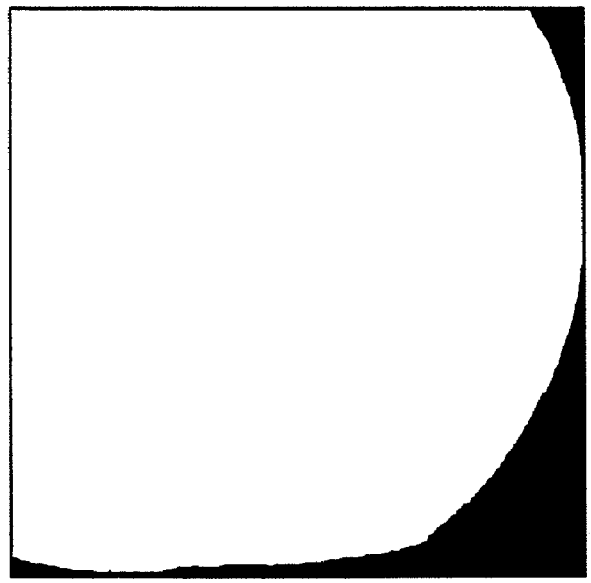

FIG. 35 is a diagram showing a subject image extracted on the sectional image at the position of the lung of the subject.

Part (A) of FIGS. 34 and 35 is a diagram showing the extraction of the subject image using the conventional body surface extraction unit, and part (B) of FIGS. 34 and 35 are diagrams showing the extraction of a subject image using the body surface extraction unit 200 shown in FIG. 4.

In the sectional image at the position of the nose of the subject, the image density of the nostril area connected to the exterior of the body is very low. In the case where the high-density image on the sectional image is extracted as a subject image using the conventional body surface extraction unit, therefore, as shown in part (A) of FIG. 34, a hole is opened in the nostril area.

Also, in the sectional image at the position of the lung of the subject, the fact that the lung contains the air reduces the image density of the lung area, so that a hole is opened in the lung area in the conventional body surface extraction unit as shown in part (A) of FIG. 35.

According to this embodiment, the Z-direction connection of plural high-density images extracted on plural sectional images is analyzed, and high-density images in the same high-density image group are searched for in which the area is sharply reduced and the surrounding length is increased (the area difference of 250 pixels or more and the surrounding length difference 100 or more in the lung area shown in FIG. 35). The low-density image having a hole, if adjoined by high-density images in the sectional image, is corrected to a high-density image. As a result, as shown in part (B) of FIGS. 34 and 35, the hole in the subject image is filled and the body surface can be detected with high accuracy.

Figure 36:
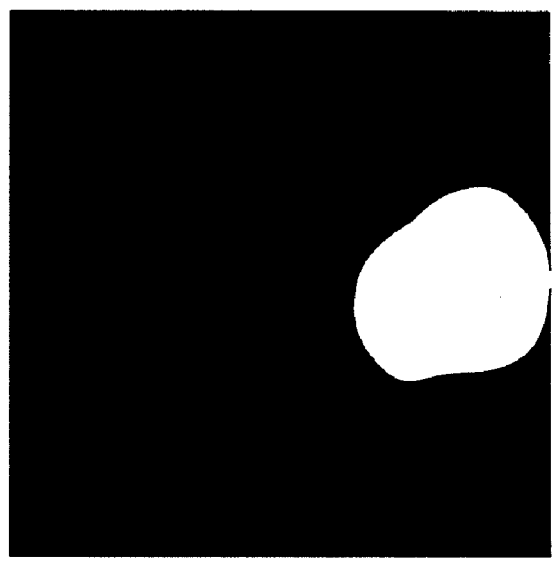
FIG. 36 is a diagram showing a subject image extracted on the sectional image at the position of the legs of the subject.
Figure 36:
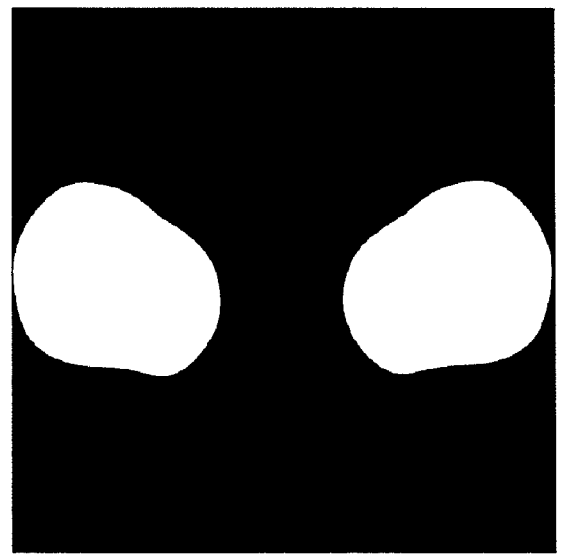

FIG. 36 is a diagram showing a subject image extracted on the sectional image at the leg position of the subject.

Part (A) of FIG. 36 is a diagram showing the extraction of a subject image using the conventional body surface extraction unit, and part (B) of FIG. 36 is a diagram showing the extraction of a subject image using the body surface extraction unit 200 shown in FIG. 4.

In the conventional body surface extraction unit, upon extraction of plural high-density images from a sectional image, the high-density image having the largest area among them is determined as a subject image, and therefore, one of the legs may be lost.

According to this embodiment, the two high-density images each displayed with two legs are analyzed as connected in a series of high-density image groups along Z direction, and therefore, both of the high-density images can be extracted as a subject image. Also, even in the case where the sectional image from just under the knee to the toes is photographed, two high-density image groups each containing two high-density images are extracted, and the volume of the two three-dimensional images formed by each high-density image group is calculated. In the case where one of the three-dimensional image has a volume at least one half of the volume of the other three-dimensional image, the two high-density image groups are judged as a part of the subject group, and therefore, the two high-density images can be both extracted as a subject image group.

Figure 37:
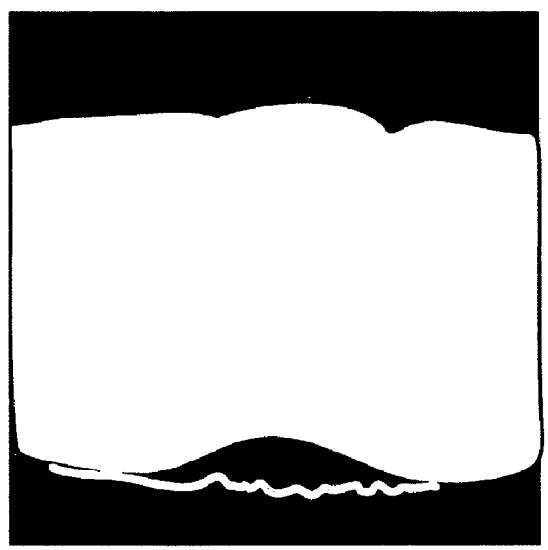
FIG. 37 is a diagram showing an image of a subject extracted on the sectional image photographed from a subject covered with a blanket.
Figure 37:
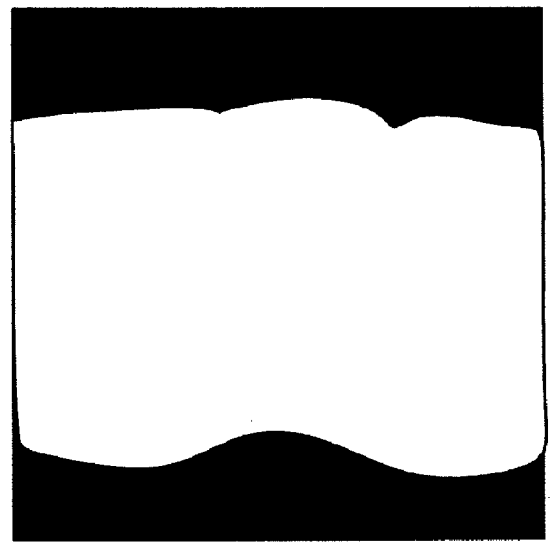

FIG. 37 is a diagram showing a subject image extracted on the sectional image of the subject photographed with a blanket covered on him/her.

Part (A) of FIG. 37 is a diagram showing the extraction of a subject image using the conventional body surface extraction unit, and part (B) of FIG. 37 a diagram showing the extraction of a subject image using the body surface extraction unit 200 shown in FIG. 4.

The thickness of the blanket is about 1 pixel or two, and therefore, by using the morphological process of cutting off one surrounding pixel and adding one pixel again as a surrounding pixel, the image portion of the blanket can be removed with high accuracy.

The foregoing result confirms that the subject image can be extracted with high accuracy according to this embodiment.

Next, the processing speed is explained.

In the conventional body surface extraction unit, it takes about 15 seconds to extract the subject image from each of 400 sectional images. In spite of this, demand is now to extract subject images from 300 sectional images in three seconds or less.

Using the body surface extraction unit 200 shown in FIG. 4, the processing time for extracting the subject image on the sectional image is measured. The test is conducted in the environment specified by Pentium (registered trademark) 4 3 GHz, RAM 1 GByte.

Table 1 shows the measurement result of the processing speed according to this embodiment.

TABLE 1

|  | Number of sheets | Processing time (ms) | Processing time/number of sheets (ms/sheet) |
|---|---|---|---|
| Max. | 421 | 962 | 2.29 |
| Min. | 7 | 15 | 2.14 |
| Average | 68.36 | 146.02 | 2.14 |

As shown in Table 1, in the longest processing time, subject images can be extracted from about 400 sectional images in not longer than one second. Thus, the target of extracting subject images from 300 sectional images in not longer than 3 seconds is fully achieved.

Some reasons why this embodiment can remarkably shorten the processing time are considered below.

(1) By using the two-dimensional labeling method of first extracting the boundary line and painting the interior of the boundary line, a low-density image, if included in the high-density image, is not required to be filled later, thereby achieving a high processing speed.

(2) In the three-dimensional labeling process, the contour of the three-dimensional image is not actually extracted, but only the two-dimensional high-density images are coupled to each other. Thus, the processing time can be remarkably reduced.

(3) The maximum and minimum values of X and Y coordinates in the high-density image are held, and the process is executed only in the minimum rectangle included. Thus, the unrequited process can be saved.

(4) The high-speed painting algorithm described above is used.

(5) By using the reduced image (label image), the pixel search time, etc. can be reduced.

The effectiveness of this embodiment is confirmed as described above.

The image display apparatus according to the present invention, though described above as an application to a diagnostic apparatus, may alternatively be used also for the management server, etc. with equal effect.

What is claimed is:

1. An image analysis apparatus comprising:
an image acquisition section that acquires a plurality of sectional images obtained by photographing a subject;
a density classification section that classifies pixels in each of the plurality of sectional images into high density pixels and low density pixels;
a two-dimensional labeling section that attaches label numbers to high density image portions each of which is constituted by the high density pixels on each of the plurality of sectional images;
a three-dimensional labeling section that couples label data between the plurality of sectional images; and
a classification section that classifies image portions of each of the plurality of sectional images into a first image group formed by image portions inside the subject and a second image group formed by image portions outside the subject, based on the coupled label data,
wherein the classification section calculates, when two three-dimensional images formed by two high-density image portion groups respectively are extracted in the classification section, volume of each of the two three-dimensional images, and
the classification section determines that both of the two high-density image portion groups are parts of a subject image group if volume of one or the two three-dimensional images is not less than a half of volume of the other of the two three-dimensional images.

2. The image analysis apparatus according to claim 1, wherein the classification section classifies a series of image portions continuous over a plurality of sectional images into the same image group.

3. The image analysis apparatus according to claim 1, wherein in the case where an image portion in one sectional image surrounds another image portion, the classification section classifies these image portions into the same image group.

4. An image analysis apparatus comprising:
an image acquisition section that acquires a plurality of sectional images obtained by photographing a subject;
a density classification section that classifies pixels in each of the plurality of sectional images into high density pixels and low density pixels;
a two-dimensional labeling section that attaches label numbers to high density image portions each of which is constituted by the high density pixels on each of the plurality of sectional images;
a three-dimensional labeling section that couples label data between the plurality of sectional images; and
a classification section that classifies image portions of each of the plurality of sectional images into a first image group formed by image portions inside the subject and a second image group formed by image portions outside the subject, based on the coupled label data,
wherein the image acquisition section acquires, as the plurality of sectional images, a plurality of sectional images at each of a plurality of slice positions arranged in a predetermined direction in the subject and the classification section reclassifies, among the image portions having been classified into the second image group, an image portion that is inserted between the image portions classified into the first image group in a sectional image containing the image portion and that is sandwiched as well in the predetermined direction by the image portions classified into the first image group, as the first image group.

5. An image processing apparatus comprising:
an image acquisition section that acquires a plurality of sectional images obtained by photographing a subject;
a density classification section that classifies pixels in each of the plurality of sectional images into high density pixels and low density pixels;
a two-dimensional labeling section that attaches label numbers to high density image portions each of which is constituted by the high density pixels on each of the plurality of sectional images;
a three-dimensional labeling section that couples label data between the plurality of sectional images; and
a classification section that classifies image portions of each of the plurality of sectional images into a first image group formed by image portions inside the subject and a second image group formed by image portions outside the subject, based on the coupled label data; and
an image processing section that removes the second image group included in each of the plurality of the sectional images, wherein the classification section calculates, when two three-dimensional images formed by two high-density image portion groups respectively are extracted in the classification section, volume of each of the two three-dimensional images, and the classification section determines that both of the two high-density image portion groups are parts of a subject image group if volume of one or the two three-dimensional images is not less than a half of volume of the other of the two three-dimensional images.

6. A non-transitory computer-readable medium that stores an image analysis program which is executed in a computer, and which constructs on the computer, an image acquisition section that acquires a plurality of sectional images obtained by photographing a subject;

a density classification section that classifies pixels in each of the plurality of sectional images into high density pixels and low density pixels;

a two-dimensional labeling section that attaches label numbers to high density image portions each of which is constituted by the high density pixels on each of the plurality of sectional images;

a three-dimensional labeling section that couples label data between the plurality of sectional images; and a classification section that classifies image portions of each of the plurality of sectional images into a first image group formed by image portions inside the subject and a second image group formed by image portions outside the subject, based on the coupled label data, wherein the classification section calculates, when two three-dimensional images formed by two high-density image portion groups respectively are extracted in the classification section, volume of each of the two three-dimensional images, and the classification section determines that both of the two high-density image portion groups are parts of a subject image group if volume of one or the two three-dimensional images is not less than a half of volume of the other of the two three-dimensional images.

7. A non-transitory computer-readable medium that stores an image processing program which is executed in a computer, and which constructs on the computer, an image acquisition section that acquires a plurality of sectional images obtained by photographing a subject;

a density classification section that classifies pixels in each of the plurality of sectional images into high density pixels and low density pixels;

a two-dimensional labeling section that attaches label numbers to high density image portions each of which is constituted by the high density pixels on each of the plurality of sectional images;

a three-dimensional labeling section that couples label data between the plurality of sectional images; and a classification section that classifies image portions of each of the plurality of sectional images into a first image group formed by image portions inside the subject and a second image group formed by image portions outside the subject, based on the coupled label data; and an image processing section that removes the second image group covered in each of the plurality of the sectional images, wherein the classification section calculates, when two three-dimensional images formed by two high-density image portion groups respectively are extracted in the classification section, volume of each of the two three-dimensional images, and the classification section determines that both of the two high-density image portion groups are parts of a subject image group if volume of one or the two three-dimensional images is not less than a half of volume of the other of the two three-dimensional images.

* * * * *